US008613683B2

(12) United States Patent
Bidare

(10) Patent No.: US 8,613,683 B2
(45) Date of Patent: Dec. 24, 2013

(54) PNEUMATO-MECHANICAL REGENERATIVE POWER SOURCE

(76) Inventor: Srinivas R. Bidare, Farmington Hills, MI (US)

( * ) Notice: Subject to any disclaimer, the term of this patent is extended or adjusted under 35 U.S.C. 154(b) by 282 days.

(21) Appl. No.: 13/258,279

(22) PCT Filed: Apr. 15, 2010

(86) PCT No.: PCT/US2010/031321
§ 371 (c)(1),
(2), (4) Date: Sep. 21, 2011

(87) PCT Pub. No.: WO2010/121083
PCT Pub. Date: Oct. 21, 2010

(65) Prior Publication Data
US 2012/0017756 A1 Jan. 26, 2012

Related U.S. Application Data

(60) Provisional application No. 61/169,382, filed on Apr. 15, 2009.

(51) Int. Cl.
*F16H 48/06* (2006.01)
(52) U.S. Cl.
USPC ....... 475/149; 475/207; 74/89.24; 74/424.81; 74/424.89
(58) Field of Classification Search
USPC ................... 74/56.23, 89.24, 424.81–424.93; 475/149, 207
See application file for complete search history.

(56) References Cited

U.S. PATENT DOCUMENTS

| | | | |
|---|---|---|---|
| 300,290 A | 6/1884 | Troy | |
| 1,508,253 A | 9/1924 | Ross | |
| 1,578,370 A | 3/1926 | Ross | |
| 1,942,197 A | 1/1934 | Blackstock | |
| 2,633,951 A | 4/1953 | Ayer et al. | |
| 2,819,589 A | 1/1958 | Geyer | |
| 3,216,766 A | 11/1965 | Tabor | |
| 3,286,989 A | 11/1966 | Bangerter et al. | |
| 3,428,298 A | 2/1969 | Powell | |
| 3,523,593 A | 8/1970 | Karasick | |
| 3,633,875 A * | 1/1972 | Workman, Jr. | ................. 254/342 |

(Continued)

FOREIGN PATENT DOCUMENTS

| | | |
|---|---|---|
| GB | 366081 A | 1/1932 |
| GB | 384710 A | 12/1932 |
| JP | 06272660 A | 9/1994 |

OTHER PUBLICATIONS

PCT International Search Report and Written Opinion of the International searching Authority by ISA/KR in International Application No. PCT/US2010/031321, Oct. 28, 2010, 10 pp.

*Primary Examiner* — Derek D Knight
(74) *Attorney, Agent, or Firm* — Raggio & Dinnin, P.C.

(57) ABSTRACT

A pneumato-mechanical regenerative power source converts mechanical rotational power at an input/output shaft to stored potential energy, and vice versa, by coupling the input/output shaft to a ball screw via a planetary gear system, which translates a ball nut in cooperation therewith, which in turn translates a piston that provides for either compressing or expanding an associated energy storage gas. A first roller-clutch mechanism provides for locking the carrier of the planetary gear system when storing energy, and releasing the carrier when releasing stored energy, wherein upon release, the ball screw is coupled to the input/output shaft via an overrunning clutch, and the carrier may be locked to limit the release of stored energy.

53 Claims, 19 Drawing Sheets

(56) References Cited

U.S. PATENT DOCUMENTS

| | | | |
|---|---|---|---|
| 4,590,767 A | 5/1986 | Gardner, Jr. | |
| 4,942,936 A | 7/1990 | Gardner, Jr. | |
| 4,986,383 A | 1/1991 | Evans | |
| 5,024,637 A | 6/1991 | Guichard | |
| 5,134,894 A | 8/1992 | Tam | |
| 5,477,748 A | 12/1995 | Kimura | |
| 6,296,311 B1 | 10/2001 | Bonk et al. | |
| 6,401,458 B2 | 6/2002 | Jacobson | |
| 6,508,347 B1 | 1/2003 | Hochmuth | |
| 6,616,241 B1 | 9/2003 | Masuda et al. | |
| 6,662,921 B2* | 12/2003 | Yoshida et al. | 74/89.38 |
| 6,698,729 B2 | 3/2004 | Popjoy | |
| 7,107,767 B2 | 9/2006 | Frazer et al. | |
| 7,134,644 B2* | 11/2006 | Wallner | 254/331 |
| 7,284,374 B2 | 10/2007 | Buerger et al. | |
| 7,695,393 B2 | 4/2010 | Costello | |
| 2001/0022358 A1 | 9/2001 | Heun et al. | |
| 2003/0006120 A1* | 1/2003 | Yoshida et al. | 74/89.23 |
| 2004/0007437 A1 | 1/2004 | Linzell | |
| 2007/0207889 A1 | 9/2007 | Costello | |
| 2012/0132453 A1* | 5/2012 | Fu | 74/89.23 |
| 2012/0172174 A1* | 7/2012 | Kopecek | 475/329 |
| 2013/0213160 A1* | 8/2013 | Flores Giraldo et al. | 74/30 |

* cited by examiner

PNEUMATO-MECHANICAL REGENERATIVE POWER SOURCE

CROSS REFERENCE TO RELATED APPLICATIONS

The instant application is filed under 35 U.S.C. 371 as the U.S. National Stage of International Application No. PCT/US 2010/031321 filed on Apr. 15, 2010, which claims benefit of priority from U.S. Provisional Patent Application Serial No. 61/169,382, filed on Apr. 15, 2009, the entire content which is incorporated herein by reference.

BRIEF DESCRIPTION OF THE DRAWINGS

In the accompanying drawings:

FIG. 5b illustrates a central longitudinal cross-section through the pneumato-mechanical regenerative power source, with the associated piston fully retracted, with the associated energy storage gas relatively compressed;

DESCRIPTION OF EMBODIMENT(S)

Figure 1:
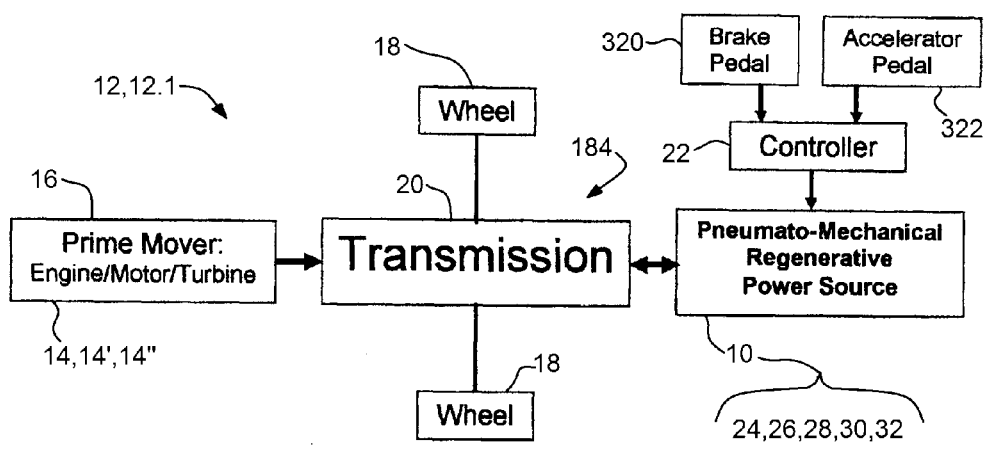
FIG. 1 illustrates a block diagram of a pneumato-mechanical regenerative power source in a vehicle.

Referring to FIG. 1, in accordance with a first aspect, a pneumato-mechanical regenerative power source 10 is incorporated in a vehicle 12 so as to provide for regenerative storage of energy therefrom, for example, for regenerative braking of the vehicle 12, so as to provide for converting vehicular kinetic energy in the form of rotational power input to the pneumato-mechanical regenerative power source 10 to stored potential energy within the pneumato-mechanical regenerative power source 10, and so as to provide for converting this stored potential energy back to kinetic energy in the form of supplemental rotational power that can be applied to propel the vehicle 12. For example, in the first aspect, the vehicle 12, 12.1 incorporates an engine 14, motor 14' or turbine 14" as the prime mover 16 thereof, which drives the drive wheels 18 of the vehicle 12 through an associated transmission 20. The pneumato-mechanical regenerative power source 10 is mechanically coupled to the transmission 20, and responsive to a signal from a controller 22, can either absorb energy from, or supply previously absorbed energy to, the transmission 20.

In a first mode of operation, the pneumato-mechanical regenerative power source 10 is coupled to a source of rotational power and the rotational power therefrom is converted to stored potential energy within the pneumato-mechanical regenerative power source 10. For example, power from the drive wheels 18 is coupled through the transmission 20 to the pneumato-mechanical regenerative power source 10, thereby providing for braking the vehicle 12, 12.1, either solely by action of the pneumato-mechanical regenerative power source 10, or in cooperation with the vehicle brakes (not illustrated). As will be described more fully hereinbelow, the pneumato-mechanical regenerative power source 10 stores energy by converting rotational motion at the input of the pneumato-mechanical regenerative power source 10 to linear motion therewithin with a rotary-driven ball-screw mechanism 24 driving through an associated planetary gear system 26 to linearly move an associated internal piston 28 that is used to compress an associated energy storage gas 30 within an associated piston cylinder 32 and thereby store associated potential energy within the resulting pressurized energy storage gas 30.

In a second mode of operation, the pneumato-mechanical regenerative power source 10 provides for retaining the stored potential energy within the associated pressurized energy storage gas 30 with the pneumato-mechanical regenerative power source 10 substantially decoupled from the associated source or sink of power.

In a third mode of operation, the pneumato-mechanical regenerative power source 10 is coupled to a rotational power sink, i.e. a load, and the stored potential energy within the pneumato-mechanical regenerative power source 10 is converted to rotational power that is coupled to the load. For example, the stored potential energy in the pressurized energy storage gas 30 within the pneumato-mechanical regenerative power source 10 is converted back to rotational power by expanding the energy storage gas 30 against the piston 28, and converting the resulting linear motion of the piston 28 back to rotational motion through by action of the ball-screw mechanism 24, wherein this rotational motion is then coupled to the transmission 20 so as to provide power thereto, for example, so as to provide for propelling the vehicle 12 either solely from the pneumato-mechanical regenerative power source 10, or in cooperation with the engine 14.

Figure 2:
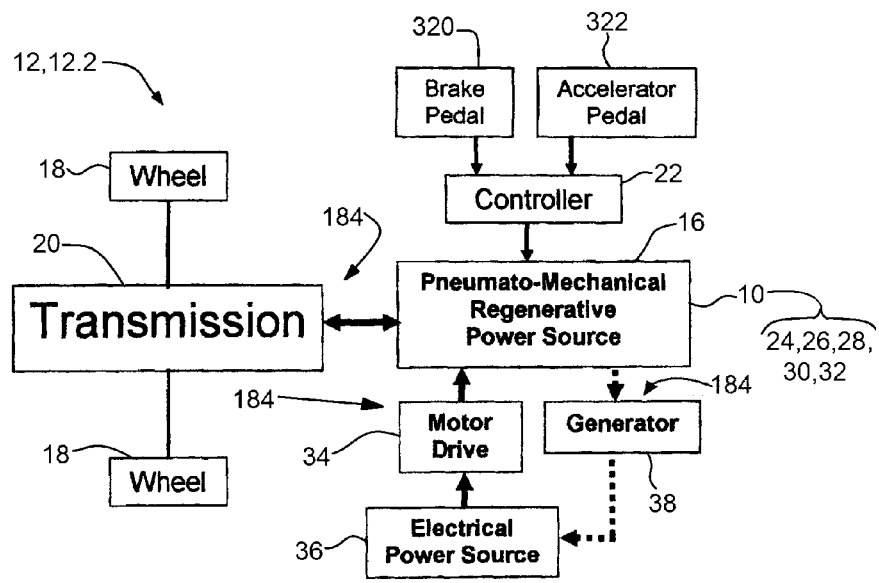
FIG. 2 illustrates a block diagram of a vehicle incorporating a pneumato-mechanical regenerative power source as the prime mover thereof.
Figure 3:
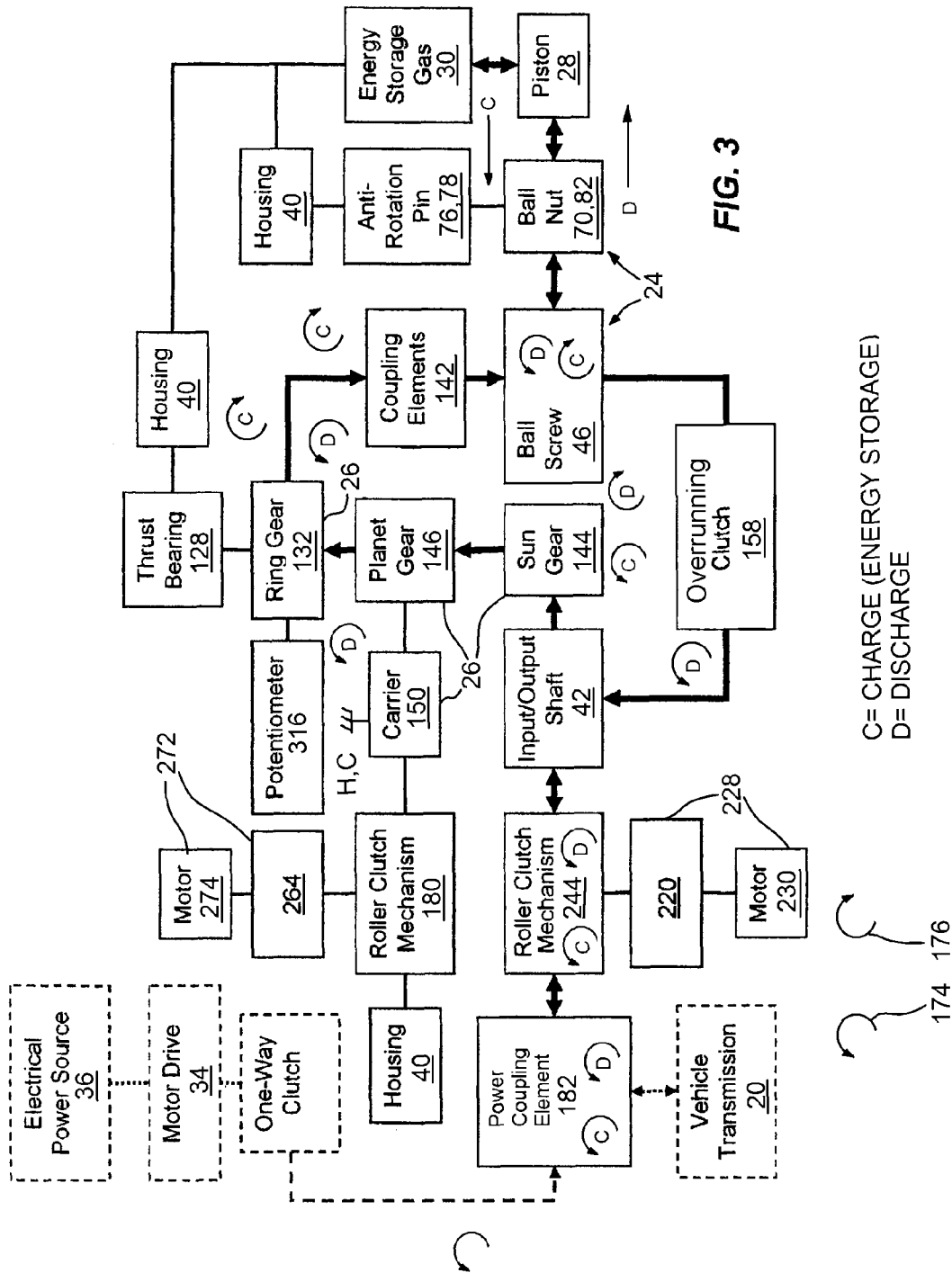
FIG. 3 illustrates a block diagram of a pneumato-mechanical regenerative power source.

Referring to FIG. 2, in accordance with a second aspect, the pneumato-mechanical regenerative power source 10 is incorporated in a vehicle 12, 12.2 as the prime mover 16 thereof, wherein the pneumato-mechanical regenerative power source 10 is charged from a motor drive 34 powered from an electrical power source 36, for example, either external of, or on-board, the vehicle 12, 12.2. For example, the electrical power source 36 could comprise either the external AC power grid,—e.g. 110-115 volts, 220-240 volts, or the like, at 50 or 60 Hz, depending upon the region of operation,—or electrical power from either a battery, fuel cell, solar cell, or on-board generator. Accordingly, in accordance with the second aspect, rotational power from the motor drive 34 is used to compress the energy storage gas 30 in accordance with the first mode of operation as described hereinabove for the first aspect, and then this stored potential energy is used to drive either the vehicle 12 through the transmission 20, or an associated generator 38 coupled to the pneumato-mechanical regenerative power source 10, in accordance with the second mode of operation as described hereinabove for the first aspect. Furthermore, as with the first aspect, in a regenerative braking mode, the pneumato-mechanical regenerative power source 10 may be used to convert kinetic energy of the vehicle 12, 12.2 to stored potential energy within the compressed energy storage gas 30 within the pneumato-mechanical regenerative power source 10, so as to both brake the vehicle 12 and recharge the pneumato-mechanical regenerative power source 10 without requiring electrical power from the electrical power source 36.

Figure 4:
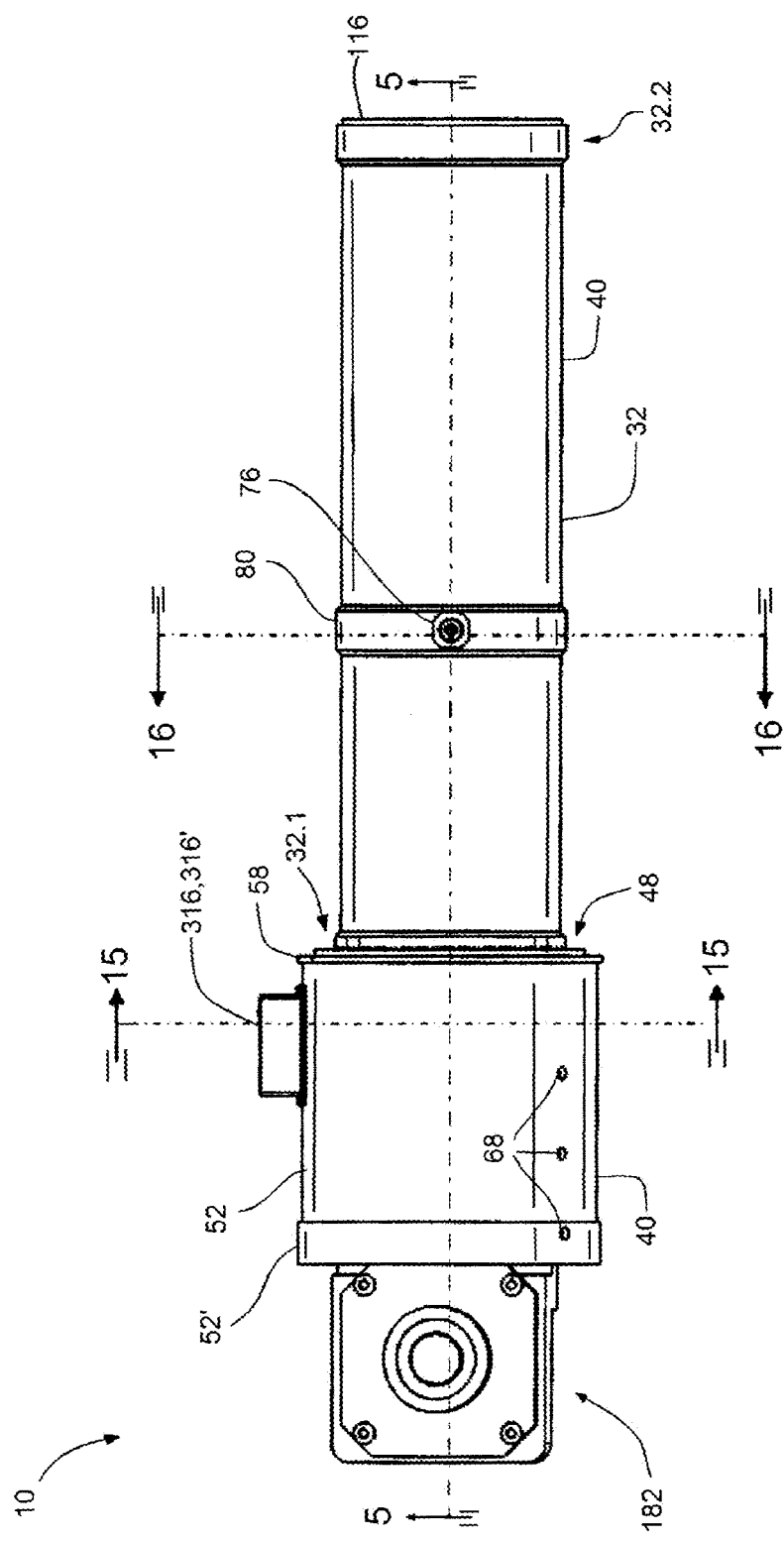
FIG. 4 illustrates a side view of a pneumato-mechanical regenerative power source.
Figure 5A:
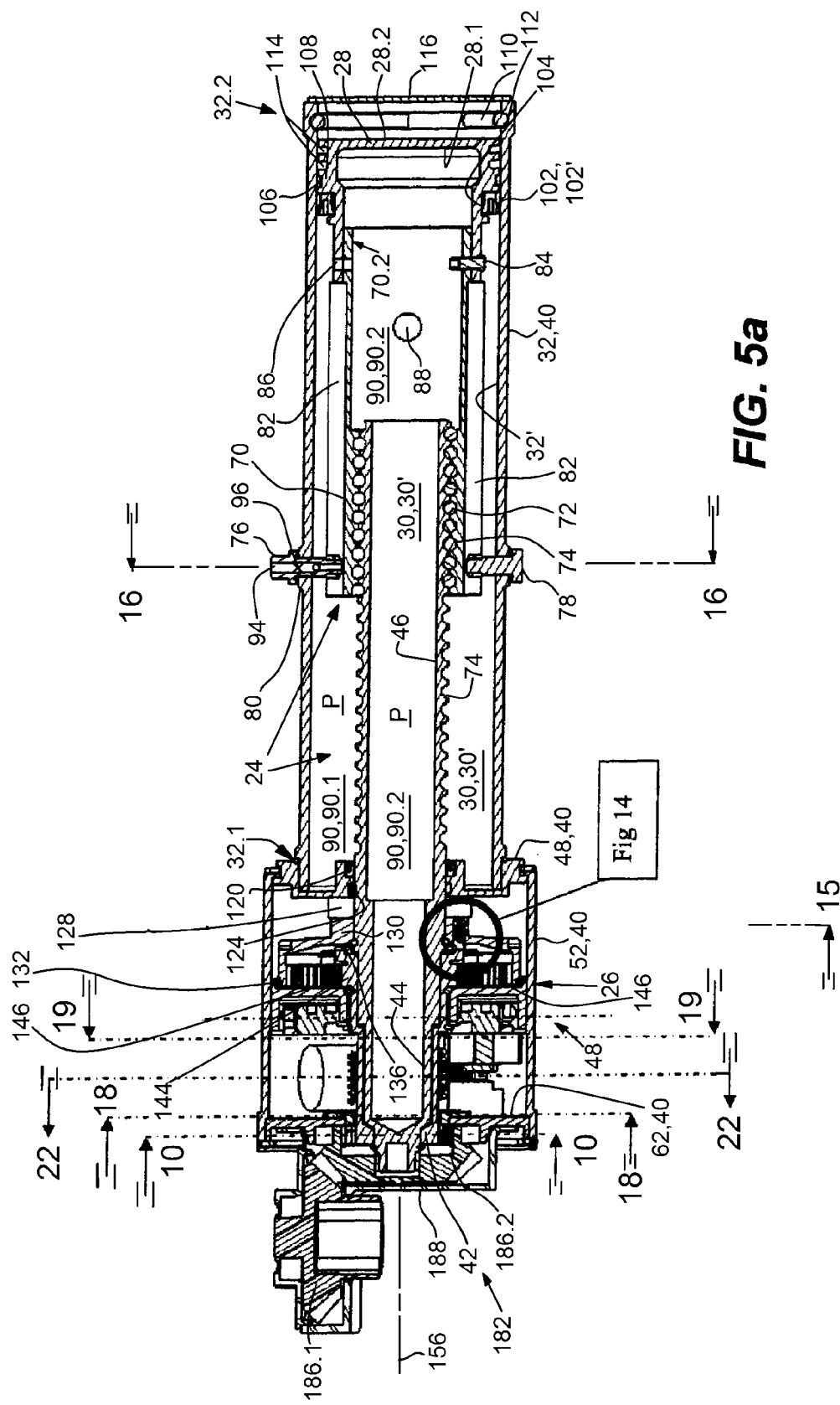
FIG. 5a illustrates a central longitudinal cross-section through the pneumato-mechanical regenerative power source, with the associated piston fully extended, with the associated energy storage gas relatively expanded.
Figure 5B:
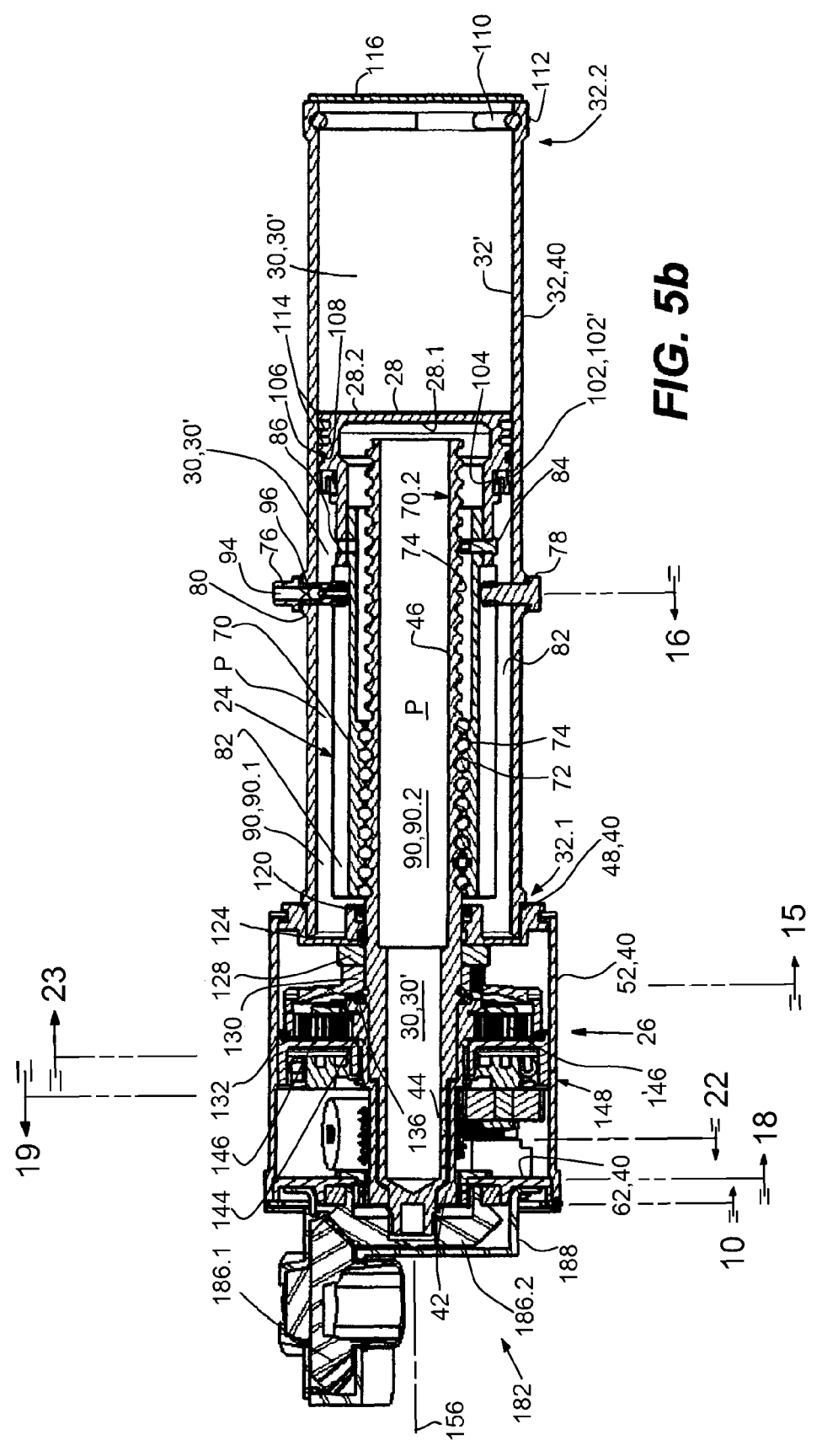
Figure 6:
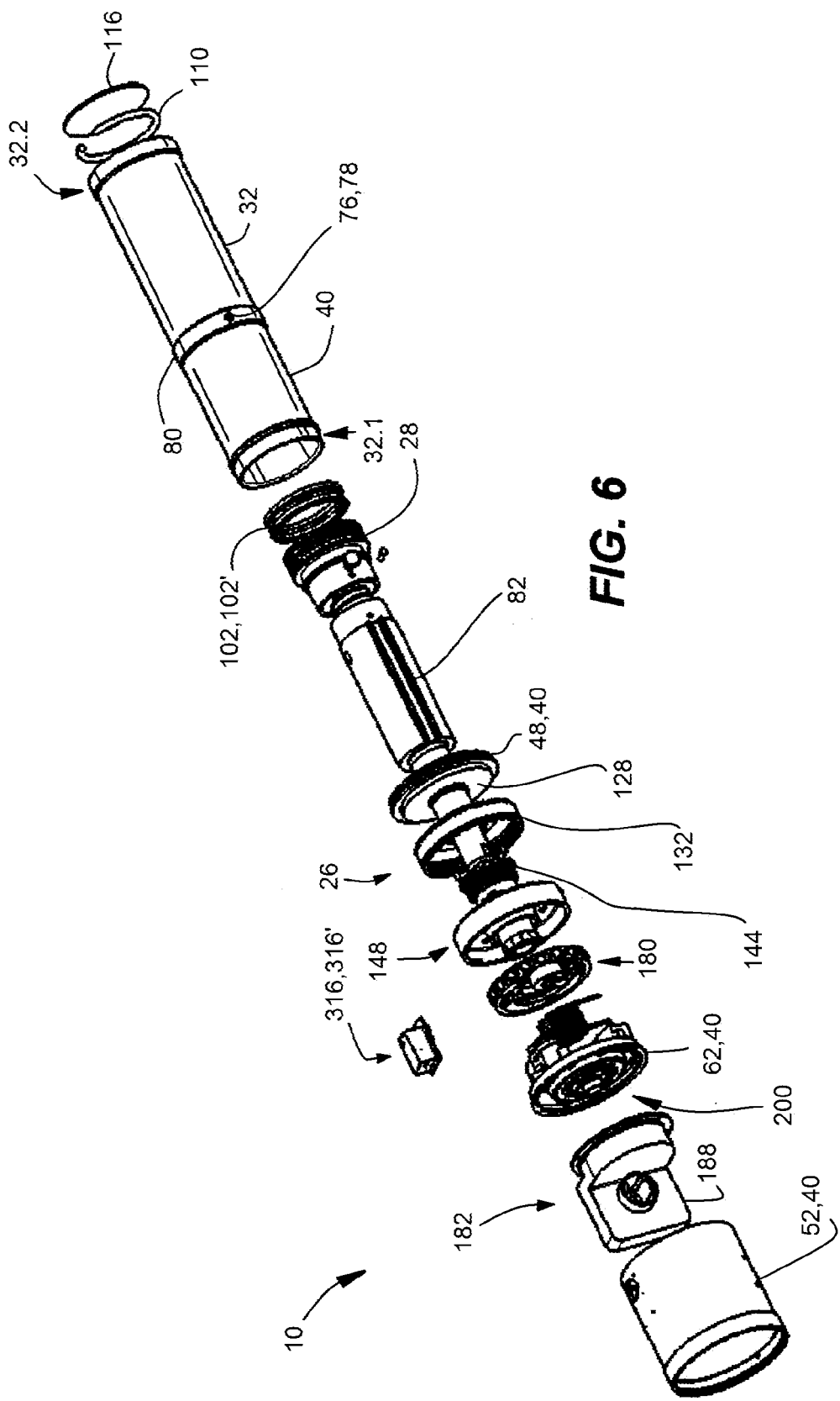
FIG. 6 illustrates an exploded view of the pneumato-mechanical regenerative power source illustrated in FIGS. 4, 5a and 5b.

Referring to FIGS. 3-7, the pneumato-mechanical regenerative power source 10 comprises a first support structure 40 that supports a hollow input/output shaft 42 and a forward shaft extension 44 of a ball screw 46 of the ball-screw mechanism 24, wherein the input/output shaft 42 is concentrically surrounds the forward shaft extension 44, each of which is rotatable with respect to one another and with respect to the first support structure 40. For example, the forward shaft extension 44 may be an integral portion of the ball screw 46, as illustrated, or may be operatively coupled thereto, for example, threaded to or press on the end the ball screw 46. In the illustrated embodiment, the outside surface of the forward shaft extension 44 and the mating inside surface of the input/output shaft 42 are each hardened and are both sized so as to provide for a running fit therebetween. The forward end 32.1 of the piston cylinder 32 is closed with a first forward end-cap 48 that is threaded onto the outside thereof and sealed with an associated elastomeric, plastic or composite O-ring 50 acting therebetween. A cylindrical housing shell 52 extends over and forward of the first forward end-cap 48, with a forward surface of an internal flange portion 54 of the cylindrical housing shell 52 abutting an aft surface of an external radial flange portion 56 of the first forward end-cap 48, and the aft end 52.2 of the cylindrical housing shell 52 is secured to the first forward end-cap 48 with an external spring clip 58 in an external groove 60 in the first forward end-cap 48. A second forward end-cap 62 is inserted into an expanded portion 52' of the cylindrical housing shell 52 at the forward end 52.1 thereof and secured therewith with an internal spring clip 64 in an internal groove 66 on the inside surface of the expanded portion 52' of the cylindrical housing shell 52 forward of the second forward end-cap 62. Accordingly, the second forward end-cap 62, cylindrical housing shell 52, first forward end-cap 48 and the piston cylinder 32 collectively constitutes the first support structure 40 that provides for supporting the remaining of the elements of the pneumato-mechanical regenerative power source 10 therewithin. Referring to FIG. 4, the cylindrical housing shell 52 incorporates a plurality of threaded mounting holes 68 that can be used to attach the pneumato-mechanical regenerative power source 10 to the associated vehicle 12.

Referring to FIGS. 5a, 5b, 6 and 16, the ball-screw mechanism 24 incorporates a ball nut 70 that engages the associated ball screw 46 with an associated plurality of balls 72 that operate therebetween within the helical grooves 74 thereof and that provide for the converting a rotation of the ball screw 46 to a translation of the associated ball nut 70, with the ball nut 70 restrained from rotation by radially-inwardly-extending diametrically-opposed first 76 and second 78 anti-rotation pins that are threaded into a reinforced mid-portion 80 of the piston cylinder 32, and that engage with corresponding diametrically-opposed external grooves 82 on the ball nut 70 so as to prevent the rotation thereof responsive to a rotation of the ball screw 46. The piston 28 is threaded onto the aft end 70.2 of the ball nut 70 and secured thereto with a rivet 84 accessible through an access hole 86 that possibly together with one or more other ports 88 on the side of the ball nut 70 also provides for fluid communication of the energy storage gas 30 from a first region 90.1 within the piston cylinder 32 external of the ball screw 44-46 and associated ball nut 70 to a second region 90.2 therewithin, wherein collectively the first 90.1 and second 90.2 regions constitute the energy storage region 90 on the forward axial side 28.1 of the piston 28, within which the recoverable potential energy of the pneumato-mechanical regenerative power source 10 is stored via the pressurization of the associated energy storage gas 30 therewith. The diametrically-opposed external grooves 82 axially extend along the length of the ball nut 70 by a sufficient distance and are adapted so as to provide for the first 76 and second 78 anti-rotation pins to engage therewith and slide therein over the full range of travel. For example, each of the first 76 and second 78 anti-rotation pins incorporate a bearing 92, for example, a needle bearing 92', on the outside thereof that each engage one of the surfaces 82' of the associated diametrically-opposed external grooves 82 and that provide for reducing the friction associated with the translation of the ball nut 70 relative to the first 76 and second 78 anti-rotation pins. The energy storage gas 30, for example, dry nitrogen 30', is admitted to the energy storage region 90 of the piston cylinder 32 through a central port 94 in the first anti-rotation pin 76 which is threaded so as to receive an associated inflation valve 96, and which incorporates a pair of transverse ports 98 extending through the sides of the first anti-rotation pin 76 in fluid communication with the central port 94 and the energy storage region 90 of the piston cylinder 32 so as to provide for the admission of the energy storage region 90 into the piston cylinder 32 from the inflation valve 96. Alternatively, the energy storage gas 30 could comprise air, or generally, any gas. Each of the first 76 and second 78 anti-rotation pins is also sealed to the outside of the reinforced mid-portion 80 of the piston cylinder 32 with corresponding O-rings 100 therebetween. The piston 28 is sealed to the central bore 32' of the piston cylinder 32 with a slidable external seal 102, for example, an external lip seal 102' within a corresponding circumferential groove 104 on the outside surface proximate to the forward axial side 28.1 of the piston 28. The piston 28 is radially located within the central bore 32' of the piston cylinder 32 with a corresponding piston ring bearing 106, for example, constructed of PTFE, in a corresponding circumferential groove 108 on the outside surface of the piston 28.

Accordingly, with the energy storage region 90 on the forward axial side 28.1 of the piston 28, the pressure P therewithin acting on the forward axial side 28.1 of the piston 28 causes a tensile load in the ball screw 46. Alternatively, the energy storage region 90 could be located on the aft axial side 28.2, which would result instead in an associated compressive load in the ball screw 46, which depending upon the length of the ball screw 46 may require additional or stronger material therein to resist buckling. With the energy storage region 90 on the forward axial side 28.1 of the piston 28, the piston cylinder 32 incorporates an internal spring clip retaining ring 110 in an internal groove 112 near the aft end 32.2 of the piston cylinder 32 so as to provide for restraining the piston 28 in the event of an associated failure of the associated elements that otherwise provide for retaining the piston 28 within the piston cylinder 32. The piston incorporates a plurality of external grooves 114 aft of the external seal 102 that provide for an associated energy-absorbing crumple zone in the event of a failure resulting in an interaction of the piston 28 with the internal spring clip retaining ring 110. Furthermore, the aft end 32.2 of the piston cylinder 32 is sealed with an end cap 116 welded thereto that further provides for retaining the piston 28 within the piston cylinder 32 in the event of a failure, and that also prevents intrusion of foreign matter.

The forward shaft extension 44 of the ball screw 46 extends through a central bore 118 in the first forward end-cap 48 and the outside surface 44' of the forward shaft extension 44 is sealed thereto by an internal seal 120, for example, an internal lip seal 120', within an internal groove 122 at a aft end 118.2 of the central bore 118 in the first forward end-cap 48, and the forward shaft extension 44 of the ball screw 46 is radially located within the central bore 118 with a corresponding bearing ring 124, for example, constructed of PTFE, in a corresponding internal groove 126 in the central bore 118 in the first forward end-cap 48. The internal seal 120 provides for maintaining a sealed connection with the outside surface 44' of the forward shaft extension 44, independent of a rotation of the latter relative to the former. The forward shaft extension 44 of the ball screw 46 extends through a thrust bearing 128 and a hub portion 130 of a ring gear 132 of the planetary gear system 26, wherein the thrust bearing 128 is axially located between an aft surface of the hub portion 130 of a ring gear 132 and a forward surface of the first forward end-cap 48.

Figure 15:
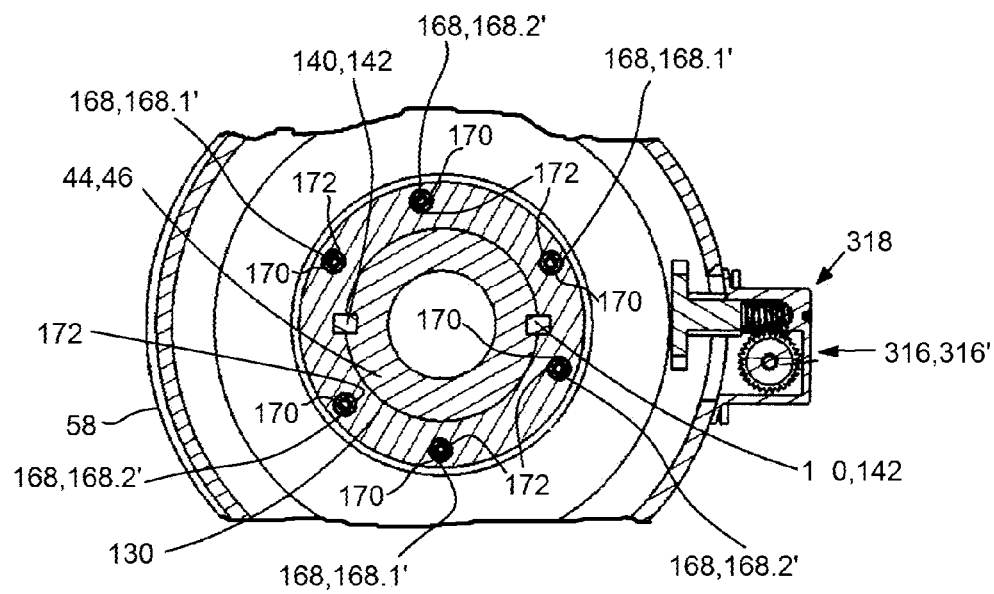
FIG. 15 illustrates a transverse cross-section through the pneumato-mechanical regenerative power source illustrated in FIGS. 4-7 with the associated cutting plane passing through a portion of the associated overrunning clutch illustrated in FIGS. 13 and 14, and through a portion of an associated position sensor.
Figure 16:
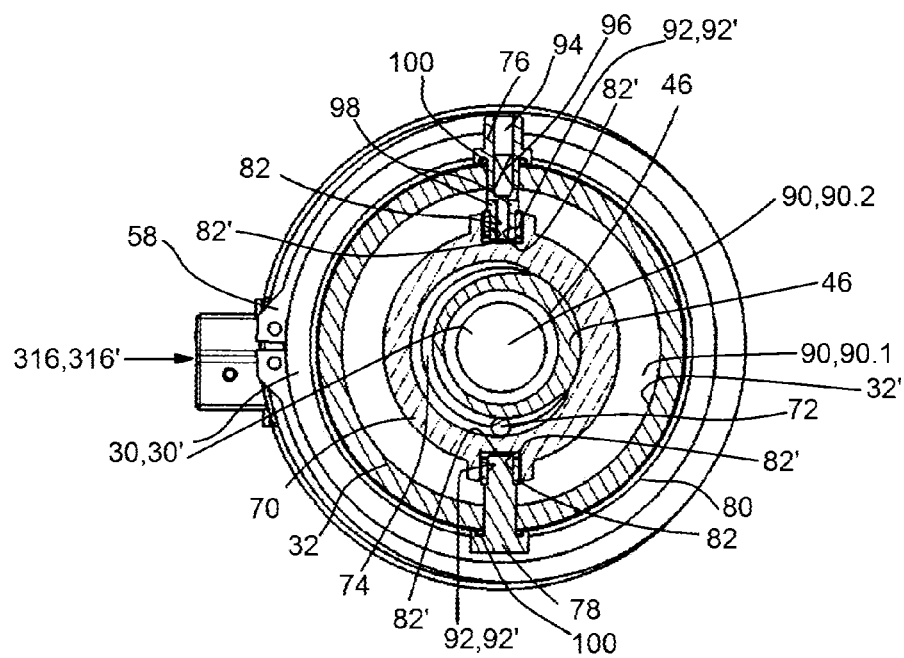
FIG. 16 illustrates a transverse cross-section through the pneumato-mechanical regenerative power source illustrated in FIGS. 4-7 with the associated cutting plane passing through a portion of an associated ball nut and through an associated pair of anti-rotation pins.
Figure 17:
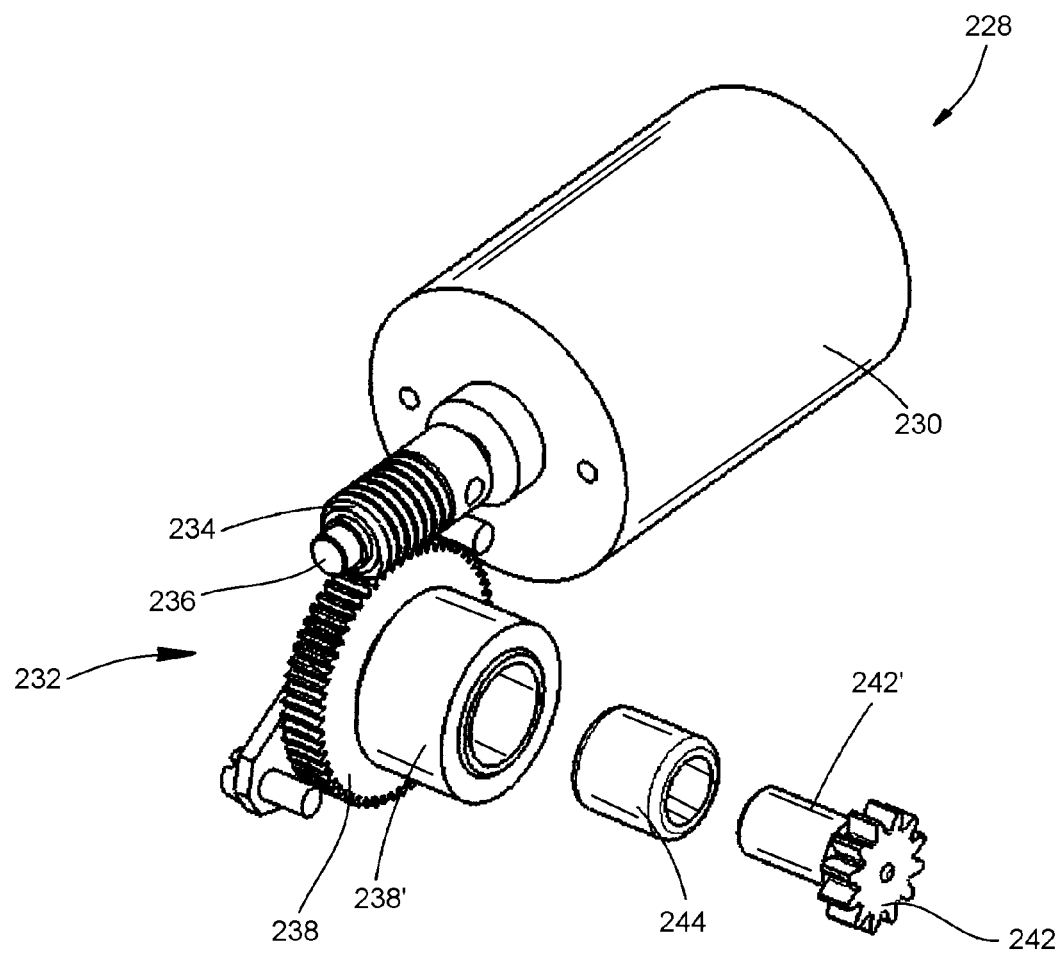
FIG. 17 illustrates an isometric view of an actuator associated with the second roller-clutch mechanism incorporated in the pneumato-mechanical regenerative power source illustrated in FIGS. 4-7.
Figure 18:
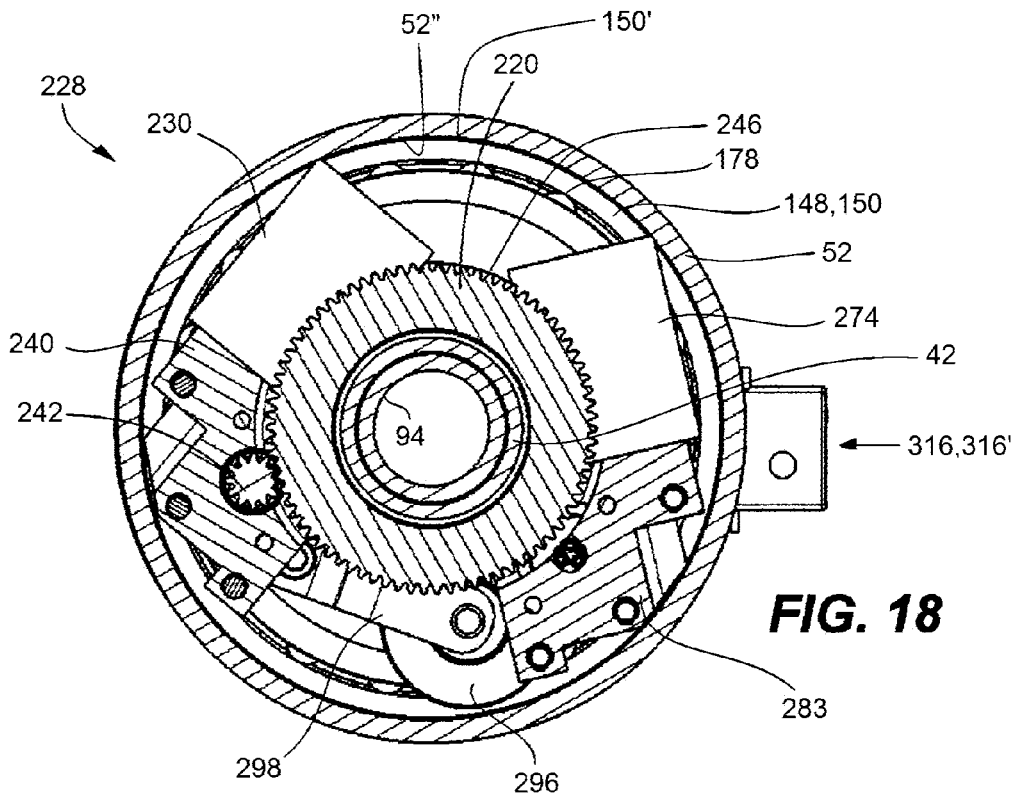
FIG. 18 illustrates a transverse cross-section through the pneumato-mechanical regenerative power source illustrated in FIGS. 4-7 with the associated cutting plane passing through a portion of the actuator and adjacent to an associated annular support structure associated with the second roller-clutch mechanism.
Figure 19:
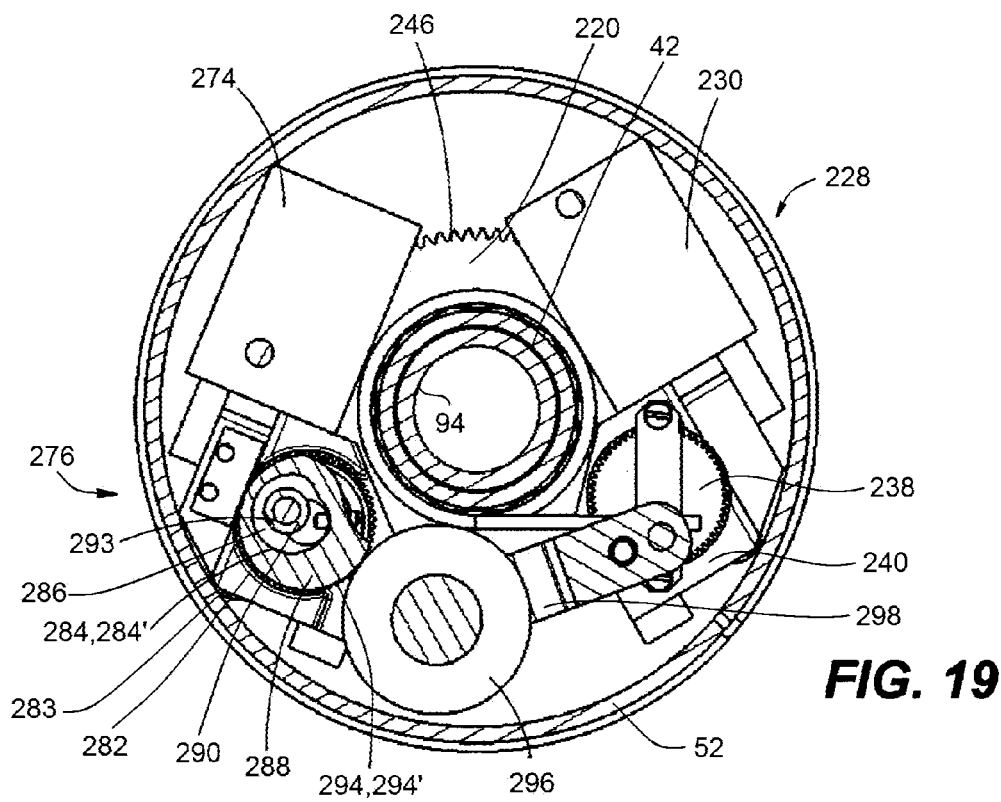
FIG. 19 illustrates a transverse cross-section through the pneumato-mechanical regenerative power source illustrated in FIGS. 4-7 with the associated cutting plane passing through a portion of the actuator associated with a first roller-clutch mechanism.
Figure 20:
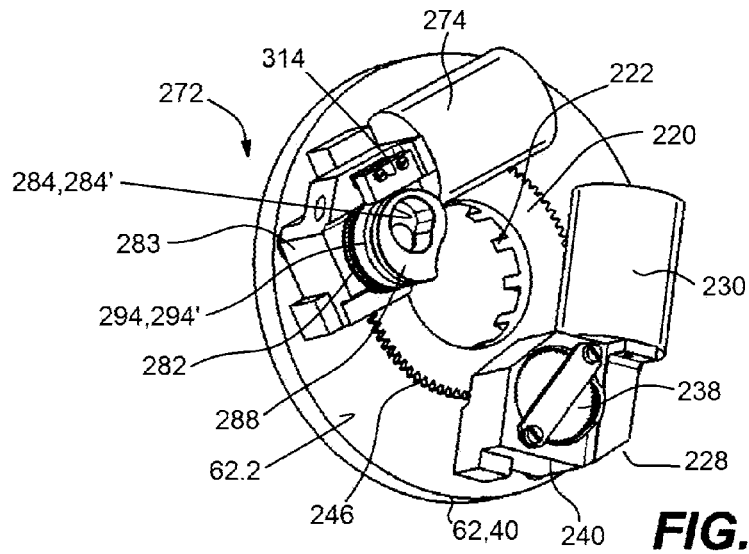
FIG. 20 illustrates a first isometric view of portions of the actuators of the first and second roller-clutch mechanisms, and an annular support structure and associated fingers depending therefrom of the second roller-clutch mechanism, of the pneumato-mechanical regenerative power source illustrated in FIGS. 4-7.
Figure 21:
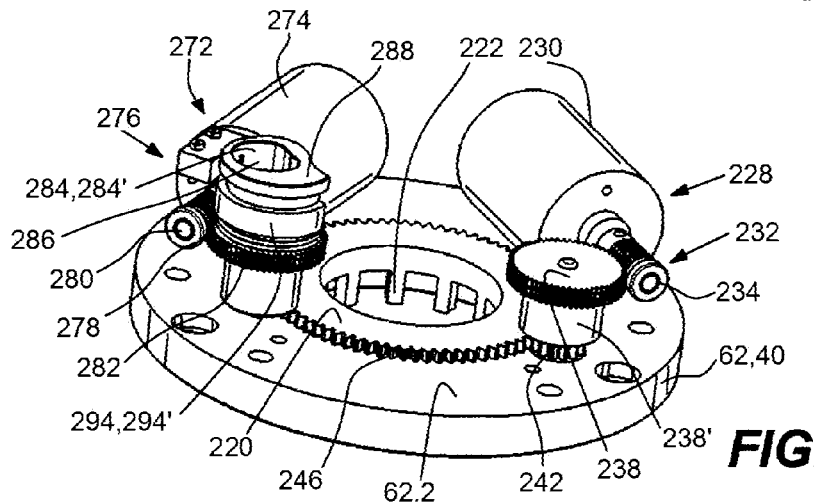
FIG. 21 illustrates a second isometric view of portions of the actuators of the first and second roller-clutch mechanisms, and an annular support structure and associated fingers depending therefrom of the second roller-clutch mechanism, of the pneumato-mechanical regenerative power source illustrated in FIGS. 4-7.
Figure 22:
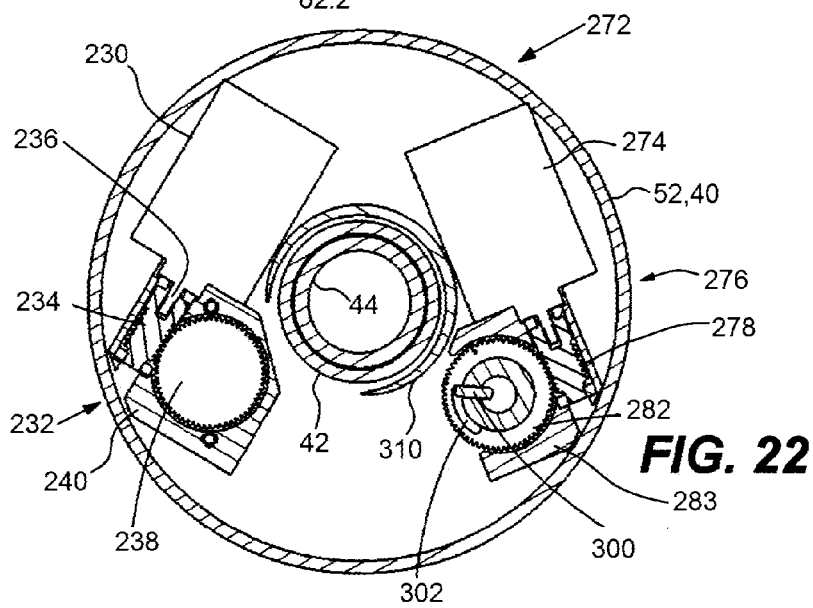
FIG. 22 illustrates a transverse cross-section through the pneumato-mechanical regenerative power source illustrated in FIGS. 4-7 with the associated cutting plane passing through portions of actuators associated with the first and second roller-clutch mechanisms.
Figure 23:
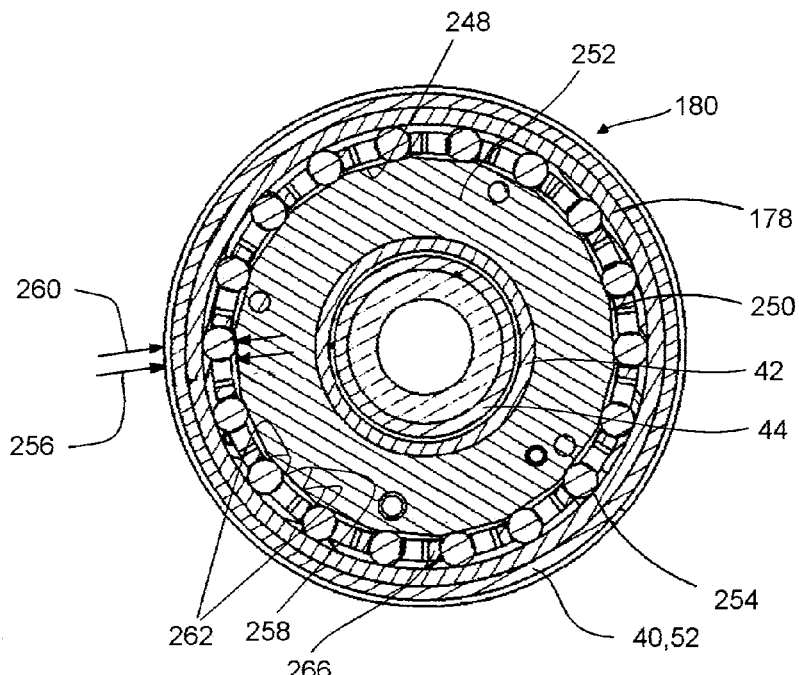
FIG. 23 illustrates a transverse cross-section through the pneumato-mechanical regenerative power source illustrated in FIGS. 4-7 with the associated cutting plane passing through the associated first roller-clutch mechanism.
Figure 24:
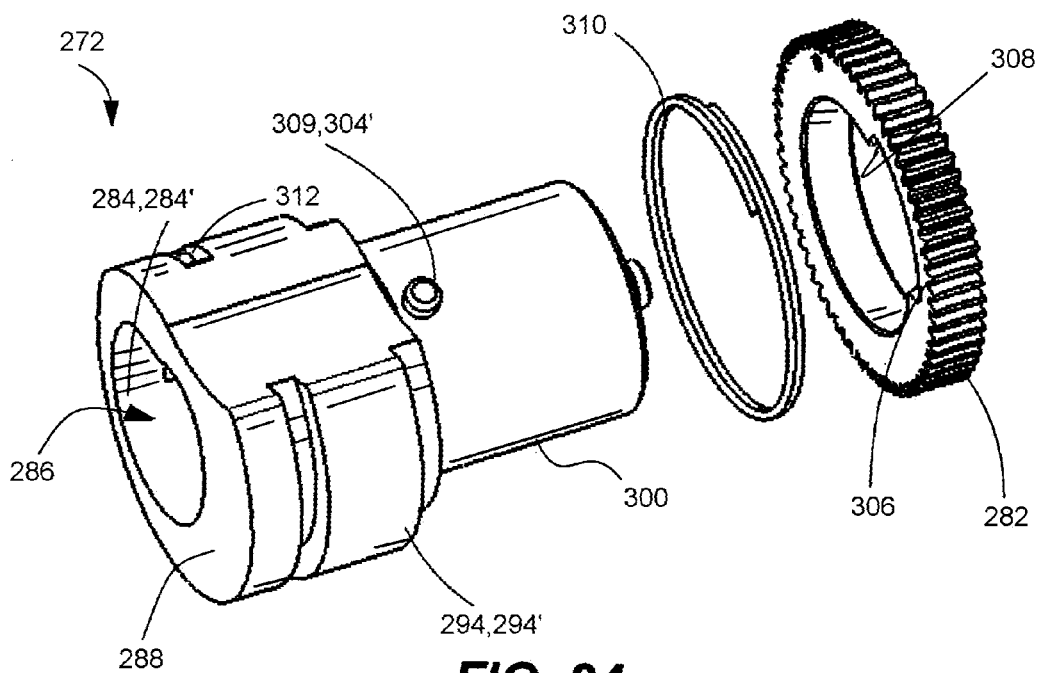
FIG. 24 illustrates an isometric view of an actuator associated with the first roller-clutch mechanism incorporated in the pneumato-mechanical regenerative power source illustrated in FIGS. 4-7.
Figure 25:
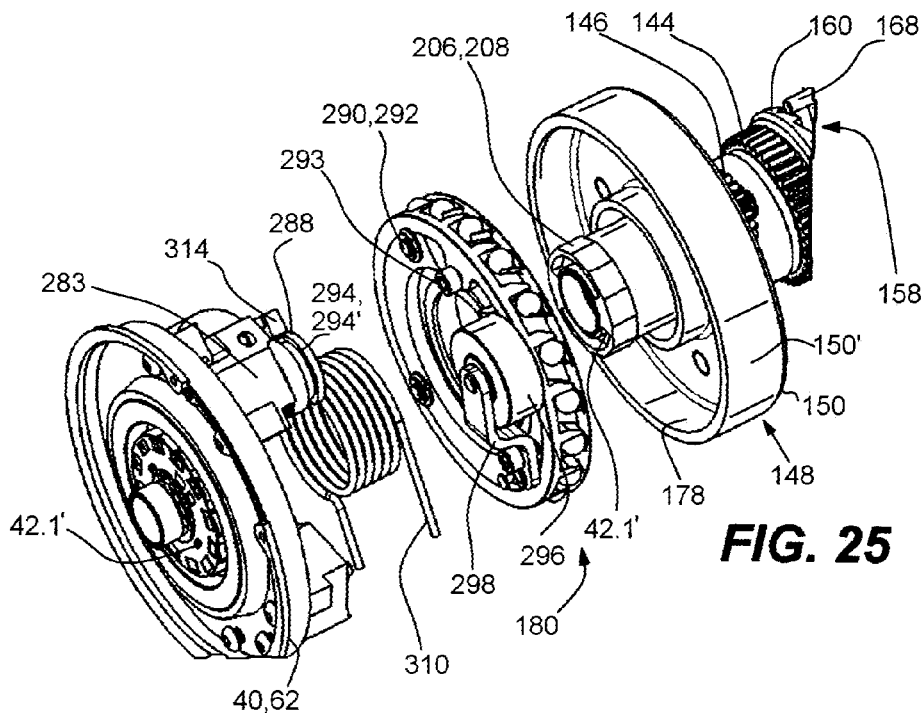
FIG. 25 illustrates a first exploded view of a portion of the first roller-clutch mechanism incorporated in the pneumato-mechanical regenerative power source illustrated in FIGS. 4-7.
Figure 26:
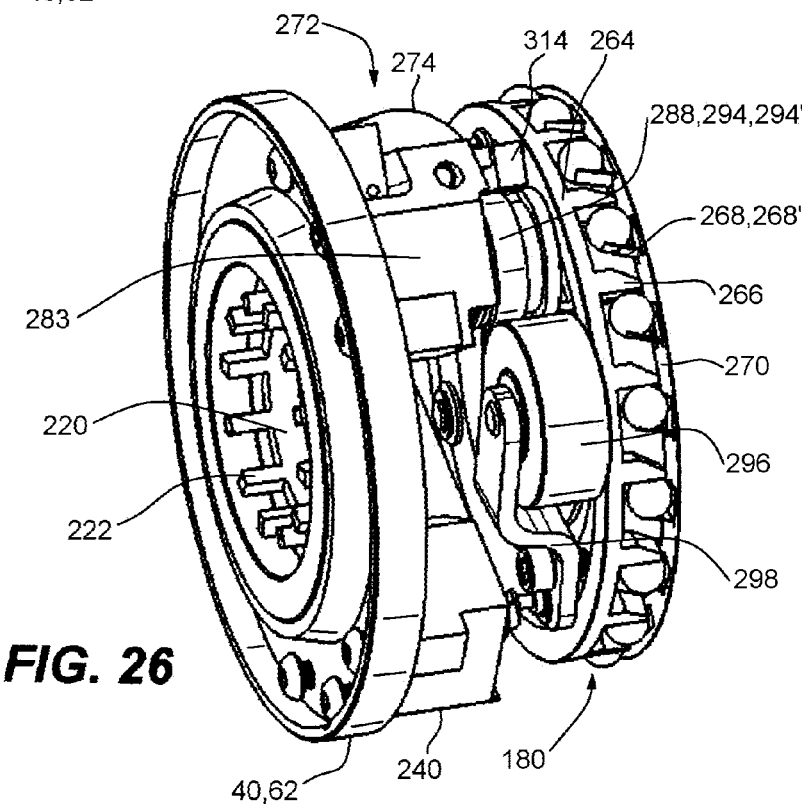
FIG. 26 illustrates a first isometric view of a portion of the first roller-clutch mechanism incorporated in the pneumato-mechanical regenerative power source illustrated in FIGS. 4-7.
Figure 27:
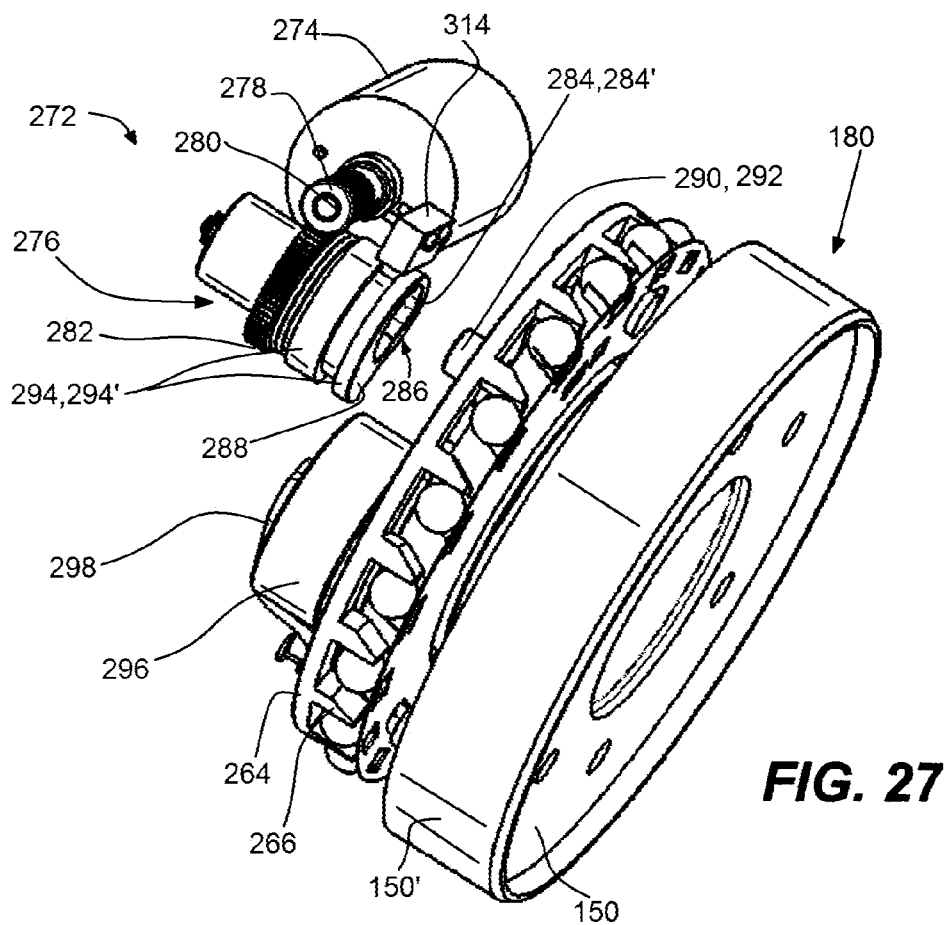
FIG. 27 illustrates a second exploded view of portions of the first roller-clutch mechanism incorporated in the pneumato-mechanical regenerative power source illustrated in FIGS. 4-7.
Figure 28:
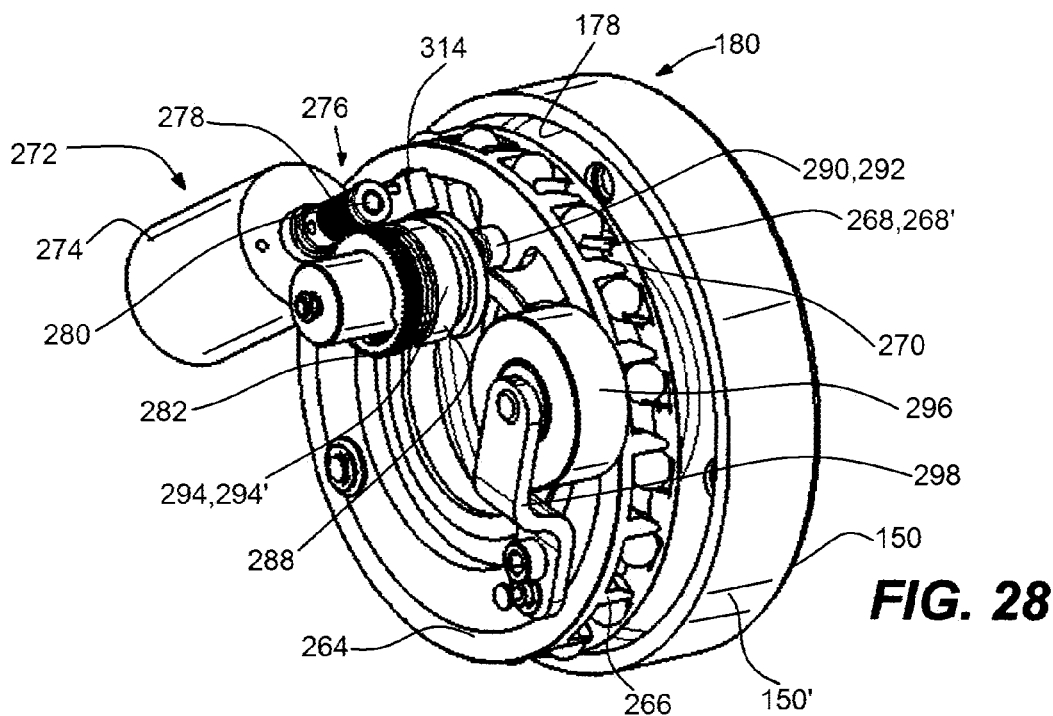
FIG. 28 illustrates a second isometric view of the first roller-clutch mechanism incorporated in the pneumato-mechanical regenerative power source illustrated in FIGS. 4-7.

An external spring clip 136 located in a corresponding external groove 138 on the outside surface 44' of the forward shaft extension 44 axially retains the ball screw 46 within the pneumato-mechanical regenerative power source 10 by transferring the pressure load of the energy storage gas 30 acting on the forward axial side 28.1 of the piston 28 to a thrust load on the thrust bearing 128 that is reacted by the first forward end-cap 48 coupled to the forward end 32.1 of the piston cylinder 32. Referring to FIG. 15, the hub portion 130 of ring gear 132 is keyed to the forward shaft extension 44 of the ball screw 46 with a pair of diametrically opposed keys 140 that provide for rotationally coupling the ring gear 132 to the ball screw 46 so as to provide for transferring torque therebetween. Alternatively, a different number of keys 140 could be used, as could a different relative orientation thereof, or the ring gear 132 could be coupled to the forward shaft extension 44 of the ball screw 46 with a spline. Collectively, the external spring clip 136 and the keys 140 constitute coupling elements 142 that provide for coupling the ring gear 132 to the forward shaft extension 44 of the ball screw 46 both axially and in rotation.

Figure 7:
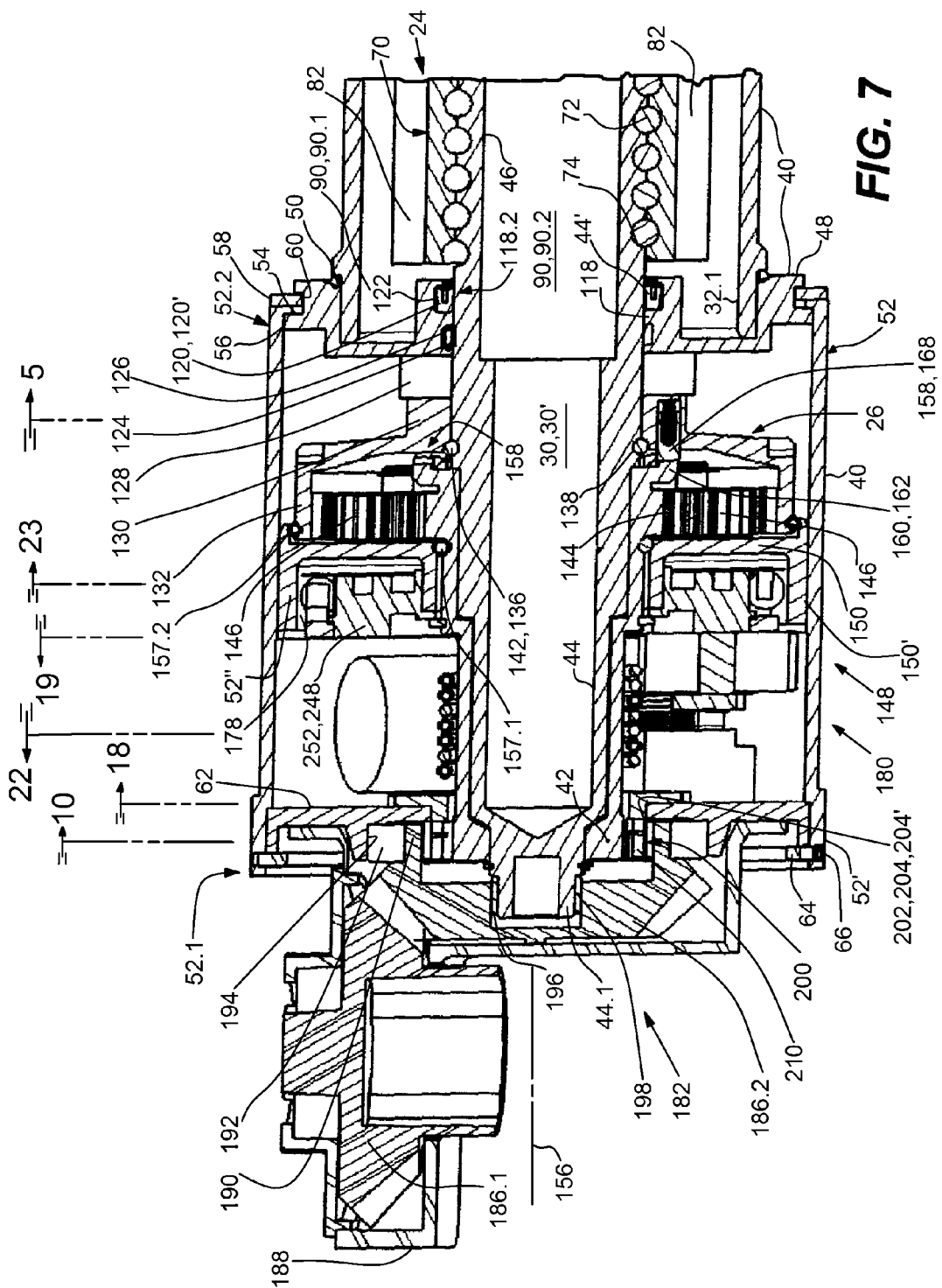
FIG. 7 illustrates an expanded fragmentary view of a forward portion of a central longitudinal cross-section through the pneumato-mechanical regenerative power source illustrated in FIGS. 4-6.
Figure 8:
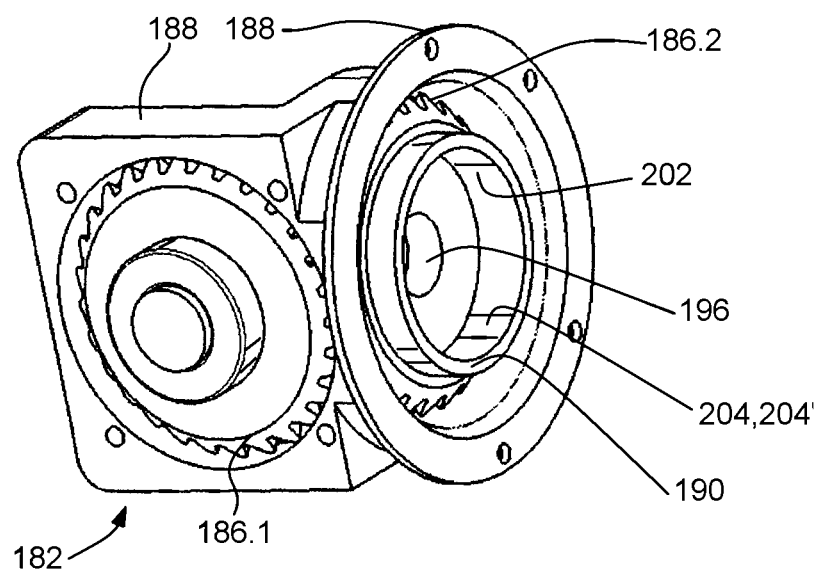
FIG. 8 illustrates one embodiment of a power coupling element associated with the pneumato-mechanical regenerative power source illustrated in FIGS. 4-7.
Figure 9:
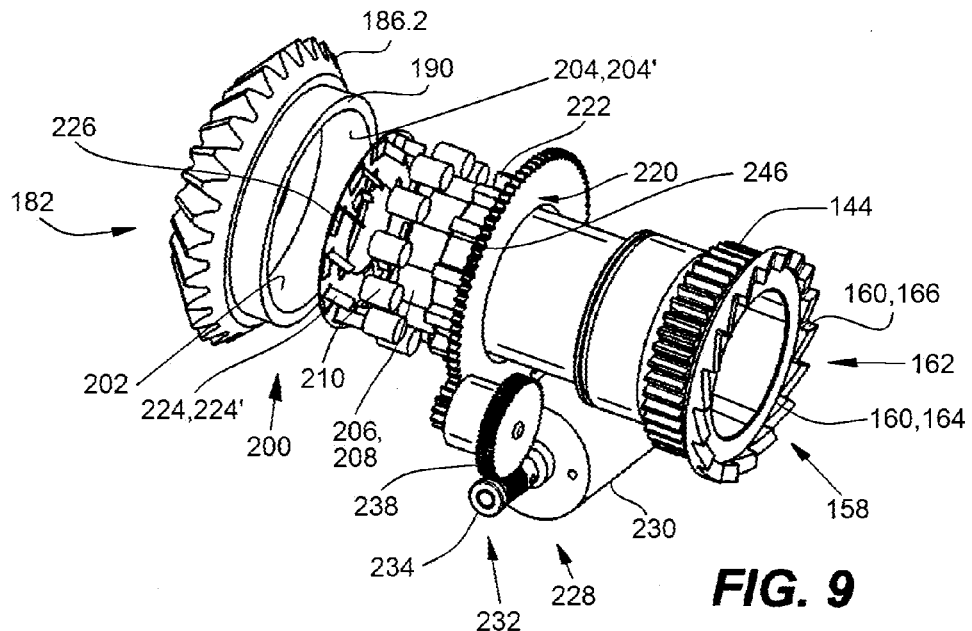
FIG. 9 illustrates an exploded view of elements associated with a second roller-clutch mechanism incorporated in the pneumato-mechanical regenerative power source illustrated in FIGS. 4-7.
Figure 10:
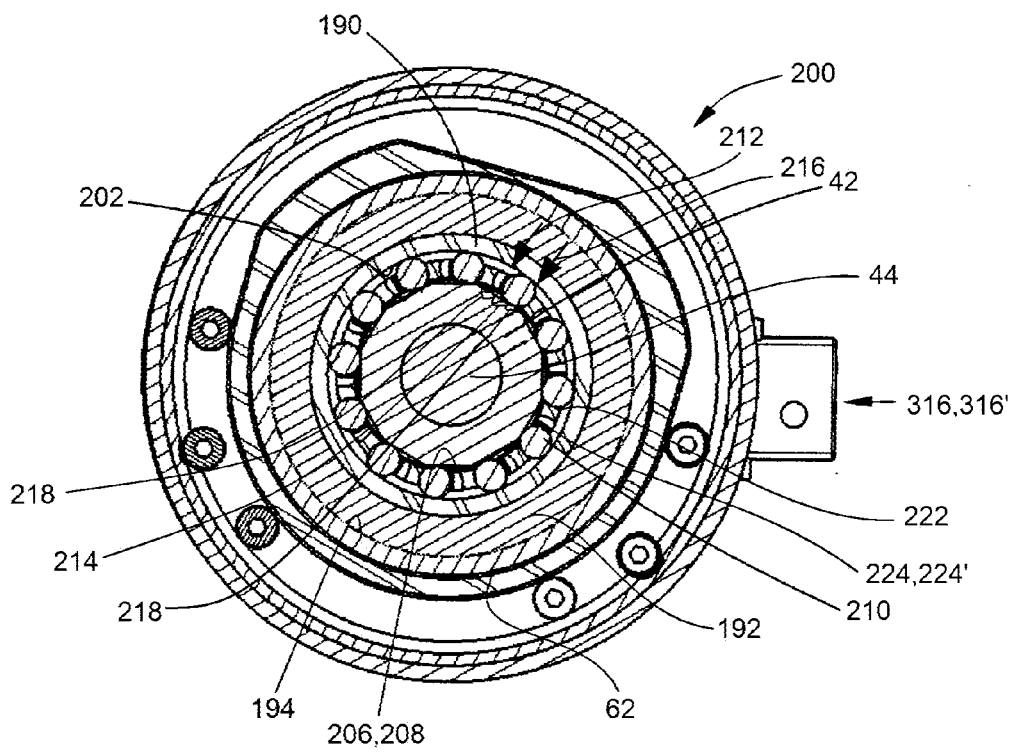
FIG. 10 illustrates a transverse cross-section through the pneumato-mechanical regenerative power source illustrated in FIGS. 4-7 with the associated cutting plane passing through the associated second roller-clutch mechanism.
Figure 11:
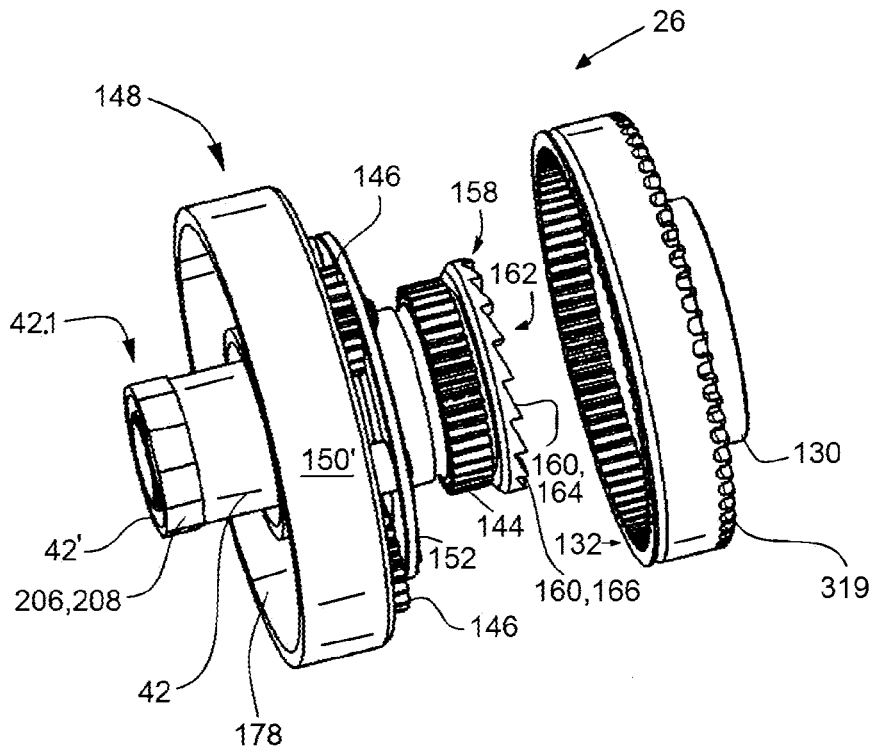
FIG. 11 illustrates an exploded view of a planetary gear system of the pneumato-mechanical regenerative power source illustrated in FIGS. 4-7.
Figure 12:
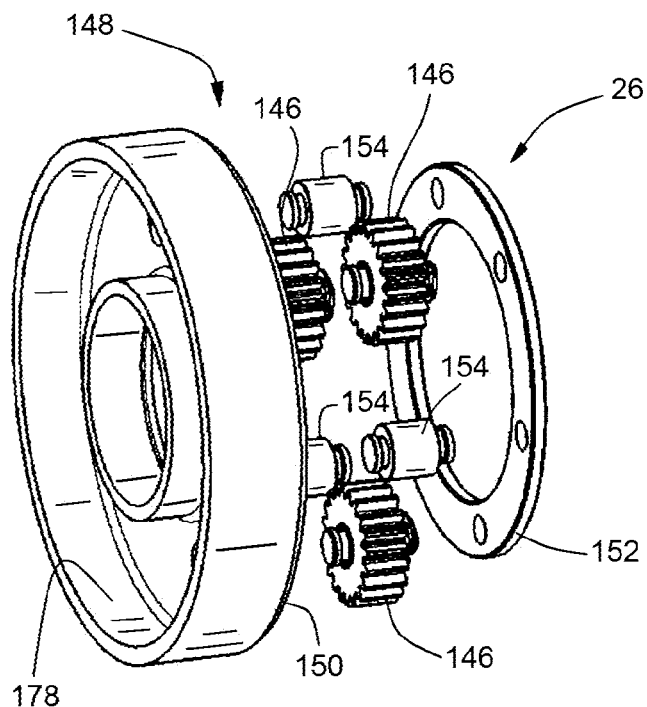
FIG. 12 illustrates an exploded view of a carrier subassembly and associated planet gears of the planetary gear system of the pneumato-mechanical regenerative power source illustrated in FIGS. 4-7.

Referring also to FIGS. 9, 11 and 12, the planetary gear system 26 further comprises a sun gear 144 concentric within the ring gear 132 and engaged therewith via a plurality of planet gears 146, for example, three planet gears 146, uniformly distributed with respect to one another between the ring 132 and sun 144 gears, wherein each planet gear 146 is engaged with both the ring gear 132 and the sun gear 144. The planet gears 146 are incorporated in carrier assembly 148 and are adapted to rotate relative thereto. For example, in on embodiment, the carrier assembly 148 further comprises an annular carrier 150 and a corresponding annular carrier ring 152 respectively forward and aft of the planet gears 146, and a plurality of pivot shafts 154 therebetween depending therefrom, wherein each planet gear 146 is supported from and rotates about a separate pivot shaft 154, with the plurality pivot shafts 154 uniformly distributed around the carrier 150 and associated carrier ring 152. For example, in one embodiment, each planet gear 146 is provided with a central bearing through which the corresponding pivot shaft 154 extends. Alternatively, each planet gear 146 could incorporate pivot shaft portions at each end thereof that engage with and rotate within corresponding holes in the carrier 150 and associated carrier ring 152. The input/output shaft 42 is operatively coupled to or a part of the sun gear 144 and extends forward thereof. The input/output shaft 42, ball screw 46 and associated forward shaft extension 44, carrier assembly 148 and ring gear 132 all rotate about a common axis of rotation 156 relative to the first support structure 40. Referring to FIG. 7, the planetary gear system 26 incorporates inner 157.1 and outer 157.2 O-ring seals between the carrier 150 and the ring gear 132 at the inner diameter of the carrier 150 and the outer diameter of the ring gear 132, respectively, so as to provide for containing a lubricant within the planetary gear system 26.

Figure 13:
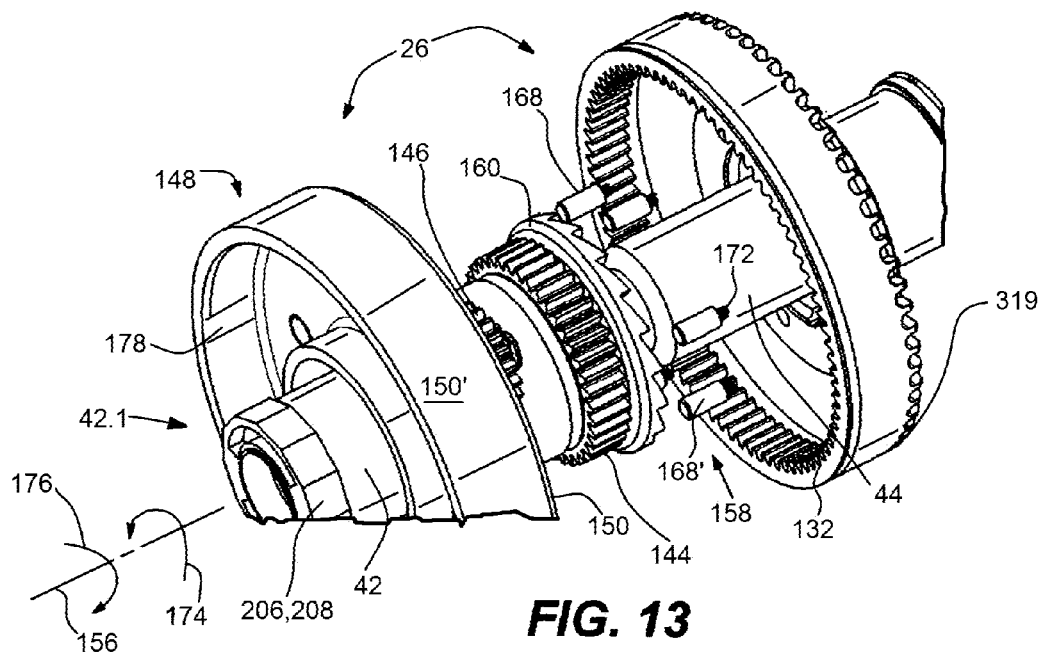
FIG. 13 illustrates an exploded view of one embodiment of an overrunning clutch of the pneumato-mechanical regenerative power source illustrated in FIGS. 4-7.
Figure 14:
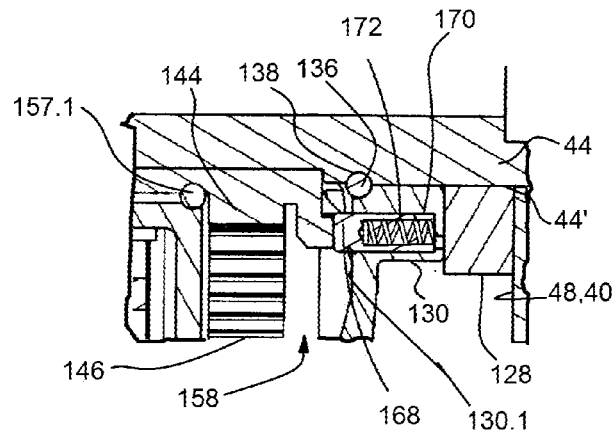
FIG. 14 illustrates a fragmentary view of longitudinal cross section through a portion of the one embodiment of the overrunning clutch illustrated in FIG. 13.

Referring also to FIGS. 13-15, the pneumato-mechanical regenerative power source 10 incorporates a first overrunning clutch mechanism 158 operative between the sun gear 144 and either the ring gear 132 or an element operatively coupled thereto. The first overrunning clutch mechanism 158 provides for the sun gear 144 to rotate relative to the ring gear 132 when the ring gear 132 is rotated so as to cause the ball-screw mechanism 24 to translate the piston 28 so as to decrease the volume of the first 90.1 and second 90.2 regions within the piston cylinder 32 and thereby charge the pneumato-mechanical regenerative power source 10 with potential energy, and the first overrunning clutch mechanism 158 provides for the ring gear 132 to drive the sun gear 144 when the ring gear 132 is rotated in and opposite direction so as to discharge stored potential energy from the pneumato-mechanical regenerative power source 10.

For example, in one embodiment, the first overrunning clutch mechanism 158 comprises an axially-extending sawtooth pattern 160 disposed on an aft surface 162 operatively coupled to or a part of the sun gear 144, wherein the axially-extending saw-tooth pattern 160 comprises a plurality of axially-extending ramps 164 interleaved with corresponding plurality of axially-extending steps 166. The first overrunning clutch mechanism 158 comprises a plurality of axially-disposed spring-loaded pins 168 moveable a corresponding plurality of axial bores 170 within the hub portion 130 of the ring gear 132 and biased forward of a forward surface 130.1 thereof by a corresponding plurality of compression springs 172. Accordingly, a rotation in a first rotational direction 174 of the plurality of axially-disposed spring-loaded pins 168 relative to the plurality of axially-extending ramps 164—for example, as potential energy is discharged from the pneumato-mechanical regenerative power source 10—causes at least one axially-extending step 166 of the plurality of axially-extending steps 166 to engage a portion of a side surface 168' of at least one the plurality of axially-disposed spring-loaded pins 168 so as to prevent a further relative rotational motion of the sun gear 144 relative to the ring gear 132; and a rotation in the first rotational direction 174 of the plurality of axially-extending ramps 164 relative to the plurality of axially-disposed spring-loaded pins 168—for example, as potential energy is stored in the pneumato-mechanical regenerative power source 10—causes an axially-aftward depression of the plurality of axially-disposed spring-loaded pins 168 within the corresponding plurality of axial bores 170 as the plurality of axially-extending ramps 164 rotate thereby, thereby enabling the sun gear 144 to rotate relative to the ring gear 132. For example, referring to FIG. 15, in one embodiment, the first overrunning clutch mechanism 158 comprises first 168.1' and second 168.2' subsets of axially-disposed spring-loaded pins 168, each subset 168.1', 168.2' comprising three uniformly spaced axially-disposed spring-loaded pins 168, but the different sets rotated with respect to one another relative to the axis of rotation 156, for example, by some multiple of a half of the associated saw-tooth spacing, so that the overall arrangement of axially-disposed spring-loaded pins 168 is asymmetric, so as to provide for either one subset 168.1' or the other subset 168.2' of axially-disposed spring-loaded pins 168 to engage associated axially-extending steps 166 of the axially-extending saw-tooth pattern 160 at any given time, thereby providing a finer resolution of engagement to the first overrunning clutch mechanism 158. Generally, the number of axially-disposed spring-loaded pins 168 overall or in either subset 168.1', 168.2', or the number of subsets is not limiting.

Alternatively, the first overrunning clutch mechanism 158 could be disposed between the sun gear 144 and the forward shaft extension 44 of the ball screw 46, for example, in the form of a sprag clutch.

The carrier assembly 148 further incorporates an outer race 178 of a first roller-clutch mechanism 180 that provides for releasably engaging the carrier assembly 148 to the first support structure 40, so as to provide for controlling the operation of the associated planetary gear system 26 and thereby control the associated operating mode of the pneumato-mechanical regenerative power source 10. The outer race 178 of the first roller-clutch mechanism 180 depends and extends forward from the carrier 150 and an associated external cylindrical surface 150' of the carrier 150 and outer race 178 is adapted with a running fit relative to the internal surface 52" of the cylindrical housing shell 52 so as to provide for floating relative thereto and for relative rotational motion therebetween. The structure and operation of the first roller-clutch mechanism 180 is described more fully hereinbelow.

Referring to FIGS. 4-9, the pneumato-mechanical regenerative power source 10 comprises a power coupling element 182 that provides for coupling power from a source or sink of power 184 - for example, including but not limited to a transmission 20 of a vehicle 12, a motor drive 34 or a generator 38, as described hereinabove, —external of the pneumato-mechanical regenerative power source 10 to the input/output shaft 42. For example, in the embodiment illustrated in FIGS.

4-10, the power coupling element 182 comprises a pair of mating first 186.1 and second 186.2 bevel gears enclosed in an associated housing 188 that is attached to the second forward end-cap 62 with a plurality of fasteners, wherein the first bevel gear 186.1 is adapted to be operatively coupled to the source or sink of power 184, and the second bevel gear 186.2 centered over the forward end 44.1 of the forward shaft extension 44 and adapted to rotate about the associated axis of rotation axis of rotation 156 of the pneumato-mechanical regenerative power source 10. The second bevel gear 186.2 incorporates an aftwardly-extending cylindrical shoulder 190 concentric with the axis of rotation 156, the outside surface of which mates with an associated bearing 192 that in turn mates with corresponding cylindrical bore 194 depending from and extending forward of the second forward end-cap 62, so as to provide for supporting the second bevel gear 186.2 from the first support structure 40 of the pneumato-mechanical regenerative power source 10. The second bevel gear 186.2 further incorporates a central bore 196 that mates with a corresponding bushing 198 on the forward end 44.1 of the forward shaft extension 44 so as to provide for relative rotation therebetween and so as to provide for supporting the forward end 44.1 of the forward shaft extension 44 from the first support structure 40 via the associated bearing 192 supported by second forward end-cap 62. The type of power coupling element 182 is not limiting, and generally can include, but is not limited to, either a gear, a sprocket, a pulley, a coupler or a universal joint.

Referring to FIGS. 5a, 5b, and 6-10, the power coupling element 182/second bevel gear 186.2 is operatively coupled to a forward end 42.1 of the input/output shaft 42 with a second roller-clutch mechanism 200 incorporating an outer race 202 comprising the internal surface 204' of a cylindrical bore 204 within the cylindrical shoulder 190 of the second bevel gear 186.2 concentric with the axis of rotation 156; an inner race 206 comprising a plurality of generalized facets 208 on the outside of the forward end 42.1 of the input/output shaft 42; and a plurality of rolling elements 210, wherein each rolling element 210 of the plurality of rolling elements 210 is located between the outer race 202 and one of the plurality of generalized facets 208 of the inner race 206. For example, in one embodiment, the plurality of rolling elements 210 are cylindrical rollers, and each generalized facet 208 is a planar surface. However the rolling elements 210 could also be spherical balls or some other surface of revolution. Furthermore, the generalized facet 208 could incorporate some other shape that provides for releasably engaging the inner 206 and outer 202 races together. The outer race 202 generally comprises a continuous surface of revolution about the axis of rotation 156, and although illustrated as cylindrical surface, could generally be shaped so as to conform to a shape of the rolling elements 210. The inner race 206 is generally concentric relative to the outer race 202. The inner 206 and outer 202 races are sized in respect of the plurality of rolling elements 210 so that for each generalized facet 208 of the inner race 206, a first gap 212 between the inner 206 and outer 202 races at a first range of locations 214 along the generalized facet 208 is greater than a corresponding rolling diameter of the associated rolling element 210, and a second gap 216 between the inner 206 and outer 202 races at at least one second range of locations 218 along the generalized facet 208 is less than the corresponding rolling diameter of the rolling element 210. Accordingly, with the plurality of rolling elements 210 located within the first range of locations 214, the outer race 202 is free to rotate relative to the inner race 206, but the with plurality of rolling elements 210 located within the second range of locations 218 on the portions of the plurality of generalized facets 208 in the direction of motion, the plurality of rolling elements 210 become wedged between the corresponding plurality of generalized facets 208 and the outer race 202 so as to releasably engage the inner 206 and outer 202 races together. The second roller-clutch mechanism 200 further comprises an annular support structure 220 aft of the plurality of rolling elements 210 concentric with the input/output shaft 42 rotatable with respect thereto about the axis of rotation 156 relative to the inner 206 and outer 202 races, from which depend a plurality of fingers 222, wherein each finger 222 extends axially from the annular support structure 220 into a region between the inner 206 and outer 202 races proximally adjacent to a corresponding one the plurality of rolling elements 210. The second roller-clutch mechanism 200 further comprises a plurality of bias elements 224, for example, leaf springs 224' depending from and associated annular disk 226 forward of the plurality of rolling elements 210 concentric therewith, each of which provides for biasing a corresponding rolling element 210 towards engagement of the second roller-clutch mechanism 200 when discharging potential energy from the pneumato-mechanical regenerative power source 10, wherein the annular disk 226 is operatively coupled to the forward edge 42.1' of the input/output shaft 42, for example, in one embodiment, with a plurality of axial screws extending aftwardly through the annular disk 226 into the forward edge 42.1' of the input/output shaft 42. The annular support structure 220 in a first rotational position relative to the inner race 206 provides for locating the plurality of fingers 222 so as to provide for moving the plurality of rolling elements 210 in a direction in opposition to the plurality of bias elements 224 so as to provide for engaging the inner 206 and outer 202 races so as to provide for charging the pneumato-mechanical regenerative power source 10 with potential energy from an external source of power 184'. The pneumato-mechanical regenerative power source 10 incorporates a second roller-clutch mechanism actuator 228 operatively associated with the annular support structure 220 of the second roller-clutch mechanism 200 so as to provide for controlling in which relative directions of rotation the inner 206 and outer 202 races of second roller-clutch mechanism 200 are engaged.

Referring to FIGS. 9 and 17-22, in one embodiment, the second roller-clutch mechanism actuator 228 comprises a motor 230 operatively coupled to the aft side 62.2 of the second forward end-cap 62 of the first support structure 40 that drives a corresponding worm drive 232 comprising a worm 234 operatively coupled to a drive shaft 236 of the motor 230 and a worm gear 238 driven by the worm 234 and supported for rotation by an associated support structure 240 operatively coupled to or a part of the second forward end-cap 62 of the first support structure 40. The second roller-clutch mechanism actuator 228 further comprises a spur gear 242 operatively coupled to the worm gear 238 via second overrunning clutch mechanism 244, for example, a sprag clutch, operative between a hub 238' of the worm gear 238 and a hub 242' or shaft portion of the spur gear 242 within the hub 238' of the worm gear 238. The spur gear 242 is engaged with an external gear tooth profile 246 on the outside of the annular support structure 220, and the second overrunning clutch mechanism 244 is configured to couple the spur gear 242 to the worm gear 238 so as to provide for the spur gear 242 to drive the external gear tooth profile 246 of the annular support structure 220, and the second overrunning clutch mechanism 244 is configured to disengage the worm gear 238 from the spur gear 242 so enable the annular support structure 220 to freewheel with the input/output shaft 42 when charging or discharging the pneumato-mechanical regenerative power source 10 without driving the worm gear 238, but to provide for the motor 230 to drive the spur gear 242 and associated annular support structure 220 when using the second roller-clutch mechanism actuator 228 to disconnect the input/output shaft 42 from the associated power coupling element 182. The support structure 240 incorporates a bracket that provides for retaining the worm gear 238 therewithin.

Referring to FIGS. 5a, 5b, 6, 7 and 18-28, in addition to the outer race 178 depending from the carrier 150 of the carrier assembly 148, the first roller-clutch mechanism 180 further comprises an inner race 248 comprising a plurality of generalized facets 250 on the outside of an associated rotor 252; and a plurality of rolling elements 254, wherein each rolling element 254 of the plurality of rolling elements 254 is located between the outer race 178 and one of the plurality of generalized facets 250 of the inner race 248. For example, in one embodiment, the plurality of rolling elements 254 are cylindrical rollers, and each generalized facet 250 is a planar surface. However the rolling elements 254 could also be spherical balls or some other surface of revolution. Furthermore, the generalized facet 250 could incorporate some other shape that provides for releasably engaging the inner 248 and outer 178 races together. The outer race 178 generally comprises a continuous surface of revolution about the axis of rotation 156, and although illustrated as cylindrical surface, could generally be shaped so as to conform to a shape of the rolling elements 254. The inner race 248 is generally concentric relative to the outer race 178. The inner 248 and outer 178 races are sized in respect of the plurality of rolling elements 254 so that for each generalized facet 250 of the inner race 248, a first gap 256 between the inner 248 and outer 178 races at a first range of locations 258 along the generalized facet 250 is greater than a corresponding rolling diameter of the associated rolling element 254, and a second gap 260 between the inner 248 and outer 178 races at at least one second range of locations 262 along the generalized facet 250 is less than the corresponding rolling diameter of the rolling element 254. Accordingly, with the plurality of rolling elements 254 located within the first range of locations 258, the outer race 178 is free to rotate relative to the inner race 248, but the with plurality of rolling elements 254 located within the second range of locations 262 on the portions of the plurality of generalized facets 250 in the direction of motion, the plurality of rolling elements 254 become wedged between the corresponding plurality of generalized facets 250 and the outer race 178 so as to releasably engage the inner 248 and outer 178 races together. The first roller-clutch mechanism 180 further comprises an annular support structure 264 forward of the plurality of rolling elements 254 concentric with the axis of rotation 156 rotatable with respect thereto about the axis of rotation 156 relative to the inner 248 and outer 178 races, from which depend a plurality of fingers 266, wherein each finger 264 extends axially from the annular support structure 264 into a region between the inner 248 and outer 178 races proximally adjacent to a corresponding one the plurality of rolling elements 254. The first roller-clutch mechanism 180 further comprises a plurality of bias elements 268, for example, leaf springs 268' depending from and associated annular disk 270 aft of the plurality of rolling elements 254 concentric therewith, each of which provides for biasing a corresponding rolling element 254 towards engagement of the first roller-clutch mechanism 180 when charging the pneumato-mechanical regenerative power source 10 with potential energy from an external source of power 184', wherein the annular disk 270 is operatively coupled to the rotor 252, for example, in one embodiment, with a plurality of axial screws extending forward through the annular disk 270 into the rotor 252. The annular support structure 264 in a first rotational position relative to the inner race 248 provides for locating the plurality of fingers 266 so as to provide for moving the plurality of rolling elements 254 in a direction in opposition to the plurality of bias elements 268 so as to provide for disengaging the inner 248 and outer 178 races so as to provide for discharging potential energy from the pneumato-mechanical regenerative power source 10. The pneumato-mechanical regenerative power source 10 incorporates a first roller-clutch mechanism actuator 272 operatively associated with the annular support structure 264 of the first roller-clutch mechanism 180 so as to provide for controlling in which relative directions of rotation the inner 248 and outer 178 races of first roller-clutch mechanism 180 are engaged.

In one embodiment, the first roller-clutch mechanism actuator 272 comprises a motor 274 operatively coupled to the aft side 62.2 of the second forward end-cap 62 of the first support structure 40 that drives a corresponding worm drive 276 comprising a worm 278 operatively coupled to a drive shaft 280 of the motor 274 and a worm gear 282 driven by the worm 278 and supported for rotation by an associated support structure 283 operatively coupled to or a part of the second forward end-cap 62 of the first support structure 40. The first roller-clutch mechanism actuator 272 further comprises a first cam surface 284 operatively coupled to or a part of the worm gear 282, wherein the first cam surface 284 and the worm gear 282 are supported for rotation by the support structure 283 operatively coupled to or a part of the first support structure 40, wherein the first cam surface 284 comprises an internal surface 284' within a hollow portion 286 of a cam 288; and a first cam follower 290 operative between the first cam surface 284 and the annular support structure 264 so as to provide for rotating the annular support structure 264 about the axis of rotation 156. The first cam follower 290 comprises a bearing 292 rotatable about a shaft portion 293 depending from the annular support structure 264, so as to provide for rotating the annular support structure 264 about the axis of rotation 156. The action of the first cam follower 290 following the first cam surface 284 responsive to a rotation of the cam 288 by the worm gear 282 provides for rotating the annular support structure 264 into the first rotational position relative to the inner race 248, thereby disengaging the first roller-clutch mechanism 180 and providing for the outer race 178 to rotate relative to the first support structure 40.

Following engagement of the first roller-clutch mechanism 180, the associated plurality of rolling elements 254 become wedged between the associated inner 248 and outer 178 races making it difficult to disengage the first roller-clutch mechanism 180 while under load. Accordingly, the first roller-clutch mechanism 180 is adapted so that the associated inner race 248 is rotatable with respect to the first support structure 40, and the first roller-clutch mechanism actuator 272 is adapted to provide for releasing torque from the inner race 248 by a rotation thereof prior to disengagement of the first roller-clutch mechanism actuator 272 by rotation of the annular support structure 264 by action of the first cam follower 290 following the first cam surface 284. More particularly, the first roller-clutch mechanism actuator 272 further comprises a second cam surface 294 on the outside of the cam 288, i.e. an external rotary cam surface 294' together with an associated second cam follower 296 that is operatively coupled to the inner race 248 with an associated linkage 298. Accordingly, the torque on the inner race 248 when the first roller-clutch mechanism 180 is reacted through the second cam follower 296 to the cam 288 to the associated support structure 286 of the first roller-clutch mechanism actuator 272 and finally to the second forward end-cap 62 of the first support structure 40. Accordingly, the first 48 and second 62 forward end-caps are either bolted, pinned or keyed to the associated cylindrical housing shell 52 so as to prevent rotations thereof relative to this reaction torque. Furthermore, the as the load on the inner race 248 is released by action of the first roller-clutch mechanism actuator 272, in order to prevent the worm gear from becoming overloaded and binding with the worm 278 the worm gear 282 is adapted so as to be rotatable about a shaft portion 300 operatively coupled to or a part of the cam 288, wherein the worm gear 282 comprises an internal circumferential slot 302 that cooperates with a radially-extending protrusion 304, for example, a pin 304' extending from the shaft portion 300 operatively coupled to or a part of the cam 288. The internal circumferential slot 302 comprises first 306 and second 308 radial edges that respectively engage opposing portions of the radially-extending protrusion 304 at different first and second relative rotational positions of the worm gear 282 relative to the cam 288 over a range of lost motion. The first roller-clutch mechanism actuator 272 further comprises a torsion spring 310 operative between the cam 288 and the worm gear 282 so as to provide for biasing the cam 288 relative to the worm gear 282 at a first relative rotational position corresponding to the normal operating position of the inner race 248. Furthermore, the cam 288 incorporates a plurality of position sensing lobes 312 that provide for sensing a rotation thereof by either a corresponding switch or rotational position sensor 314 so as to provide for controlling a rotation of the associated motor 274.

Figure 29A:
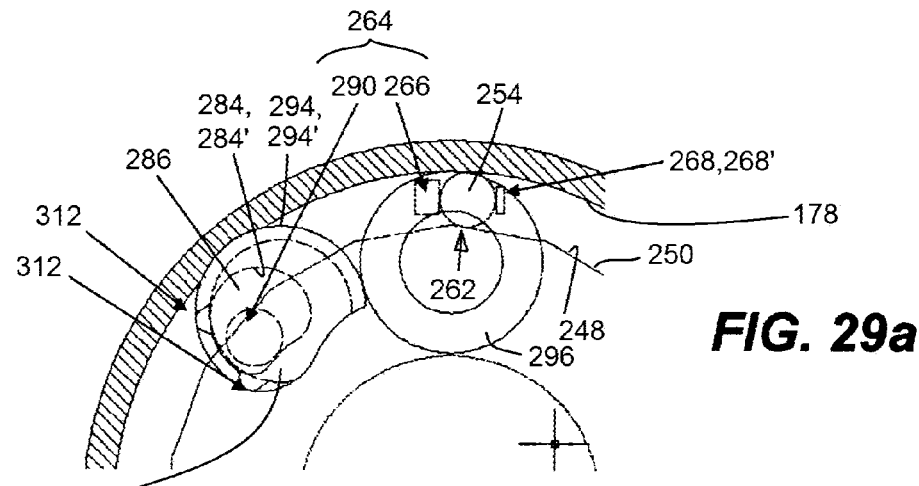
FIG. 29a illustrates a portion of the first roller-clutch mechanism incorporated in the pneumato-mechanical regenerative power source illustrated in FIGS. 4-7 with portions of the associated actuator thereof positioned so as to provide for engaging the associated inner and outer races thereof, so as to provide for charging the associated pneumato-mechanical regenerative power source.
Figure 29B:
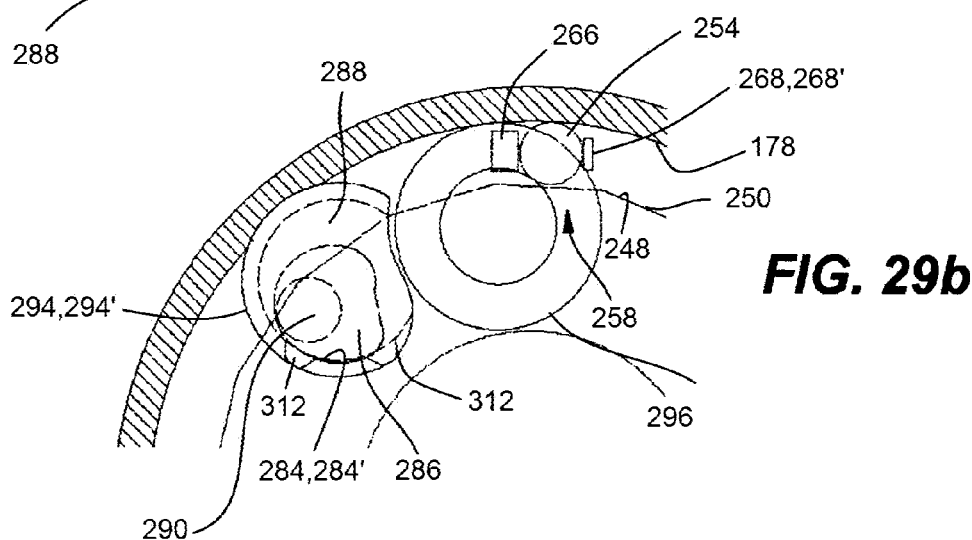
FIG. 29b illustrates a portion of the first roller-clutch mechanism incorporated in the pneumato-mechanical regenerative power source illustrated in FIGS. 4-7 with portions of the associated actuator thereof positioned so as to rotate the inner race relative to the outer race so as to release the load on the associated rolling element thereof.
Figure 29C:
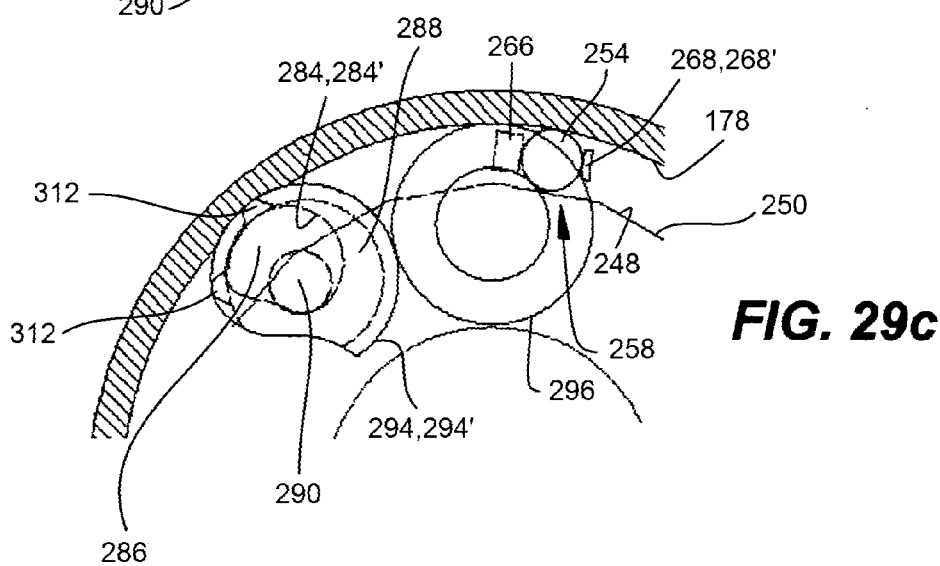
FIG. 29c illustrates a portion of the first roller-clutch mechanism incorporated in the pneumato-mechanical regenerative power source illustrated in FIGS. 4-7 with portions of the associated actuator thereof positioned so as to provide for disengaging the associated inner and outer races thereof, so as to provide for discharging the associated pneumato-mechanical regenerative power source.

For example, referring to FIG. 29a, the cam 288 is illustrated in a normal operating position with the first roller-clutch mechanism 180 engaged. In FIG. 29b, the cam 288 is rotated so as to provide for rotating the inner race 248 and releasing the load thereon responsive to the action of the second cam follower 296 on the second cam surface 294, at which time the worm gear 282 becomes rotated within the range of lost motion. In FIG. 29c, Following the load release, the cam 288 is further rotated so as to engage the first cam follower 290 with the first cam surface 284 and thereby rotate the annular support structure 264 so as to disengage the first roller-clutch mechanism 180 and provide for a discharge of potential energy from the pneumato-mechanical regenerative power source 10. Upon resumption of charging, the cam 288 is returned to the position indicted in FIG. 29a so as to engage the first roller-clutch mechanism 180.

Similarly, when switching the second roller-clutch mechanism 200 from an engaged to a disengaged mode of operation, the associated inner race 206 may be first unloaded prior to actuation of the associated second roller-clutch mechanism actuator 228 by first briefly changing the operating mode of the pneumato-mechanical regenerative power source 10. For example, if in a first mode of charging the pneumato-mechanical regenerative power source 10, then prior to disengaging the second roller-clutch mechanism 200, the pneumato-mechanical regenerative power source 10 would first be briefly operated in the third mode of discharging prior to actuating the associated second roller-clutch mechanism actuator 228 to disengage the second roller-clutch mechanism 200. As another example, if in a third mode of discharging the pneumato-mechanical regenerative power source 10, then prior to disengaging the second roller-clutch mechanism 200, the pneumato-mechanical regenerative power source 10 would first be briefly operated in the first mode of charging prior to actuating the associated second roller-clutch mechanism actuator 228 to disengage the second roller-clutch mechanism 200.

The pneumato-mechanical regenerative power source 10 further comprises a rotational position sensor 316, for example a potentiometer 316' driven by a worm-drive speed reducer 318 operatively coupled to and driven by an associated gear tooth profile 319 on the aft surface of the ring gear 132, so as to provide for measuring the linear position of the piston 28 within the piston cylinder 32.

When the vehicle is being driven in the normal mode without any brakes being applied, the second roller-clutch mechanism 200 is disengaged, so that the power coupling element 182 can rotate freely without coupling to the input/output shaft 42. When the brakes are applied by the driver to slow down the vehicle 12, motion of the brake pedal 320 is sensed and a signal is sent from the controller 22 to the second roller-clutch mechanism actuator 228 to engage the second roller-clutch mechanism 200, which thereby couples the power coupling element 182 to the input/output shaft 42. The rotation of the input/output shaft 42 rotates the sun gear 144 in a first rotational direction 174, which in turn rotates the planet gears 146 about their respective pivot shafts 154 on the carrier assembly 148. The controller 22 also sends a signal to the first roller-clutch mechanism actuator 272 to engage the first roller-clutch mechanism 180, which locks the carrier assembly 148 relatively stationary to the first support structure 40 of the pneumato-mechanical regenerative power source 10, so that the rotation of the planet gears 146 thereby rotate the ring gear 132 in a second rotational direction 176 opposite to the first rotational direction 174, thereby rotating the ball screw 46—coupled thereto by the coupling elements 142—in the second rotational direction 176, which thereby causes the ball nut 70 and piston 28 operatively coupled thereto translate forwards, thereby compressing the energy storage gas 30 in the first 900 and second 90.2 regions, which thereby provides for converting rotational power from the power coupling element 182 to potential energy stored in the pressurization of the energy storage gas 30, which thereby provides for regeneratively braking the vehicle 12.

When the operator of the vehicle 12 opens the throttle 322, the controller 22 sends a signal to the first roller-clutch mechanism actuator 272 to disengage the first roller-clutch mechanism 180, thereby enabling the carrier assembly 148 to rotate freely relative to the first support structure 40. If the energy storage gas 30 is pressurized, the resulting force on the piston 28 is coupled to the ball nut 70 which thereby causes the ball screw 46 to rotate in the first rotational direction 174, which rotation is coupled to the input/output shaft 42 by the first overrunning clutch mechanism 158 in the same direction, so as to provide for accelerating the vehicle 12.

If the operator of the vehicle 12 closes the throttle 322, the controller 22 sends a signal to the first roller-clutch mechanism actuator 272 to engage the first roller-clutch mechanism 180, thereby locking the carrier assembly 148 to the first support structure 40, which thereby prevents any further motion of the ball screw 46 and piston 28 operatively coupled thereto, thereby preventing further release of stored potential energy from the energy storage gas 30.

The pneumato-mechanical regenerative power source 10 can be used in any type of vehicle 12 without limitation of the number of wheels, drive system, weight or speed. For example, the pneumato-mechanical regenerative power source 10 could be connected to any rotational member of the vehicle driveline, for example, a drive wheel 18, differential, transfer case or transmission 20.

It should be understood that the pneumato-mechanical regenerative power source 10 can be adapted with the source or sink of power 184 coupled to either one of the sun gear 144 and the ring gear 132, and with the ball-screw mechanism 24 coupled to the other of the the sun gear 144 and the ring gear 132, notwithstanding the embodiment illustrated herein with the source or sink of power 184 coupled to the sun gear 144 and the ring gear 132 coupled to the ball-screw mechanism 24. Furthermore, it should be understood that the ball-screw mechanism 24 may be adapted so that the ball nut 70 is coupled to the planetary gear system 26 and with the ball screw 46 coupled to the piston 28. It should also be understood that the power coupling element 182 and associated second roller-clutch mechanism 200 could be adapted to operate with a different axis of rotation than the remainder of the pneumato-mechanical regenerative power source 10. It should also be understood that other types of actuators may be used for the first 272 or second 228 roller-clutch mechanism actuators, for example, hydraulic- or pneumatic-powered actuators. Finally, it should be understood that generally a circlip or snap ring may be used interchangeably with a spring clip.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth the appended claims, and any and all equivalents thereof.

What is claimed is:

1. A pneumato-mechanical regenerative power source, comprising:
   a. a first support structure;
   b. a planetary gear system, comprising:
      i. a sun gear rotatable relative to said first support structure about a first axis of rotation;
      ii. a ring gear concentrically surrounding said sun gear and rotatable about said first axis of rotation relative, to said first support structure and relative to said sun gear, wherein power is coupled into or out of said pneumato-mechanical regenerative power source through one of said sun gear or said ring gear;
      iii. a carrier rotatable about said first axis of rotation relative to said first support structure, relative to said sun gear and relative to said ring gear;
      iv. a plurality of planet gears, wherein each planet gear of said plurality of planet gears is located between and engaged with both said sun gear and said ring gear, and each planet gear of said plurality of planet gears is rotatable relative to said carrier; and
      v. a plurality of pivot shafts or pivot shaft portions, wherein each pivot shaft or pivot shaft portion is associated with a corresponding said planet gear and provides for each said corresponding said planet gear to rotate relative to said carrier;
   c. a first roller-clutch mechanism, comprising:
      i. a first outer race comprising a first continuous surface of revolution about said first axis of rotation, wherein said first outer race is operatively coupled to or a part of said carrier;
      ii. a first inner race comprising a plurality of first generalized facets, wherein said first inner race is operatively coupled to said first support structure;
      iii. a plurality of first rolling elements, wherein each first rolling element of said plurality of first rolling elements is located between said first outer race and one of said first plurality of generalized facets of said first inner race, a first gap between said first inner and outer races at a first range of locations along a first generalized facet of said plurality of first generalized facets is greater than a corresponding rolling diameter of said first rolling element, and a second gap between said first inner and outer races at at least one second range of locations along said first generalized facet is less than said corresponding rolling diameter of said first rolling element;
      iv. a first annular support structure, wherein said first annular support structure is rotatable about said first axis of rotation relative to said first inner and outer races; and
      v. a plurality of first fingers depending from said first annular support structure, wherein each first finger of said plurality of first fingers extends axially from said first annular support structure into a region between said first inner and outer races proximally adjacent to a corresponding one said first rolling element, said first annular support structure in a first rotational position provides for locating said plurality of first fingers so as to provide for moving said plurality of first rolling elements into said first range of locations along corresponding said first generalized facets of said plurality of first generalized facets so as to disengage said first inner and outer races relative to one another, and said first annular support structure in a second rotational position provides for locating said plurality of first fingers so as to provide for moving said plurality of first rolling elements into one of said at least one second range of locations along said corresponding said first generalized facets so as to engage said first inner and outer races to one another;
   d. a first actuator operatively associated with said first annular support structure so as to provide for positioning said first annular support structure in either said first rotational position or said second rotational position relative to said first support structure;
   e. a first overrunning clutch mechanism operative between said sun gear or a first element operatively coupled thereto and said ring gear or a second element operatively coupled thereto, wherein said first overrunning clutch mechanism provides for said one of said sun gear or said ring gear to rotate in a first rotational direction relative to the other of said sun gear or said ring gear, and said first overrunning clutch mechanism provides for said other of said sun gear or said ring gear to drive said one of said sun gear or said ring gear when said other of said sun gear or said ring gear is rotated in said first rotational direction;
   f. a ball-screw mechanism comprising a ball screw and a ball nut, wherein one of said ball screw or said ball nut is operatively coupled to said other of said sun gear or said ring gear so as to rotate therewith;
   g. a piston operatively coupled to the other of said ball screw or said ball nut, wherein a rotation of said one of said ball screw or said ball nut responsive to a rotation of said other of said sun gear or said ring gear causes a translation of said piston relative to said first support structure;

h. a piston cylinder operatively coupled to or a part of said first support structure, wherein said piston is configured to translate within said piston cylinder, said piston is sealed to a cylinder bore of said piston cylinder, said piston and said piston cylinder define at least one region within said piston cylinder on a first axial side of said piston, said at least one region within said, piston cylinder is sealed relative to an environment thereof, and a rotation of said other of said sun gear or said ring gear in a second rotational direction opposite to said first rotational direction coupled to said ball-screw mechanism causes a translation of said piston within said piston cylinder to as to cause a reduction in a volume of said at least one region within said piston cylinder; and i. at least one anti-rotation pin operative between said piston cylinder and said other of said ball screw or said ball nut so as to prevent a rotation of said other of said ball screw or said ball nut relative to said piston cylinder.

2. A pneumato-mechanical regenerative power source as recited in claim 1, wherein each first rolling element comprises a ball bearing or a cylindrical roller, said first continuous surface of revolution of said first outer race comprises a first cylindrical surface, and each said first generalized facet on said first inner race comprises a planar surface.

3. A pneumato-mechanical regenerative power source as recited in claim 1, further comprising a plurality of first bias elements interposed between said plurality of first fingers and said plurality of first rolling elements, wherein said plurality of first bias elements provide for biasing said plurality of first rolling elements toward said at least one second range of locations so as to provide for engaging said first inner and outer races to one another responsive to a rotation of said first outer race in said first rotational direction.

4. A pneumato-mechanical regenerative power source as recited in claim 1, wherein said first actuator comprises:
   a. a first motor operatively coupled to said first support structure;
   b. a first worm drive operatively coupled to and driven by said first motor, wherein said first worm drive comprises:
      i. a first worm operatively coupled to a drive shaft of said first motor; and
      ii. a first worm gear driven by said first worm;
   c. a first cam surface operatively coupled to or a part of said first worm gear, wherein said first cam surface and said first worm gear are supported for rotation by a second support structure operatively coupled to or a part of said first support structure; and
   d. a first cam follower operative between said first cam surface and said first annular support structure so as to provide for rotating said first annular support structure about said first axis of rotation.

5. A pneumato-mechanical regenerative power source as recited in claim 4, wherein said first cam surface comprises an internal surface within a hollow portion of a cam, and said first cam follower comprises a bearing rotatable about a shaft portion depending from said first annular support structure.

6. A pneumato-mechanical regenerative power source as recited in claim 4, wherein an action of said first cam follower following said first cam surface responsive to a rotation of said cam by said first worm gear provides for rotating said first annular support structure into said first rotational position, thereby disengaging said first roller-clutch mechanism and providing for said first outer race to rotate relative to said first support structure.

7. A pneumato-mechanical regenerative power source as recited in claim 1, wherein said first inner race is rotatable relative to said first support structure, and either said first actuator or another actuator provides for rotating said first inner race in said first rotational direction relative to said first support structure so as to provide for disengaging said first roller-clutch mechanism.

8. A pneumato-mechanical regenerative power source as recited in claim 7, further comprising:
   a. a second cam surface, wherein said second cam surface is movable relative to said first support structure responsive to an actuation by either said first actuator or by said another actuator; and
   b. a second cam follower, wherein said second cam follower is operatively coupled to said first inner race so as to provide for rotating said first inner race relative to said first support structure responsive to an action of said second cam surface on said second cam follower.

9. A pneumato-mechanical regenerative power source as recited in claim 8, wherein said second cam surface comprises an external rotary cam surface, and said second cam follower is operatively coupled to said first inner race with an associated first linkage.

10. A pneumato-mechanical regenerative power source as recited in claim 5, wherein said first inner race is rotatable relative to said first support structure, and either said first actuator or another actuator provides for rotating said first inner race in said first rotational direction relative to said first support structure so as to provide for disengaging said first roller-clutch mechanism, further comprising:
    a. a second cam surface, wherein said second cam surface comprises an external rotary cam surface on said cam that is rotatable relative to said first support structure responsive to an actuation by said first actuator; and
    b. a second cam follower, wherein said second cam follower is operatively coupled to said first inner race with an associated first linkage.

11. A pneumato-mechanical regenerative power source as recited in claim 10, wherein said first worm gear is rotatable about a shaft portion operatively coupled to or a part of said cam, said first worm gear comprises an internal circumferential slot that cooperates with a radially-extending protrusion extending from said shaft portion operatively coupled to or a part of said cam, and said internal circumferential slot comprises first and second radial edges that respectively engage opposing portions of said radially-extending protrusion at different first and second relative rotational positions of said first worm gear relative to said cam over a range of lost motion, further comprising a torsion spring operative between said cam and said first worm gear so as to provide for biasing said cam relative to said first worm gear at said first relative rotational position.

12. A pneumato-mechanical regenerative power source as recited in claim 11, wherein said cam is configured to provide for sensing a rotation thereof by either a corresponding switch or rotational position sensor so as to provide for controlling a rotation of said first motor.

13. A pneumato-mechanical regenerative power source as recited in claim 1, wherein said first overrunning clutch mechanism comprises:
    a. an axially-extending saw-tooth pattern disposed on an aft surface operatively coupled to or a part of said one of said sun gear or said ring gear, wherein said axially-extending saw-tooth pattern comprises a plurality of axially-extending ramps interleaved with corresponding plurality of axially-extending steps; and
    b. at least one axially-disposed spring-loaded pin moveable within a corresponding at least one axial bore within a hub portion of said other of said sun gear or said ring gear and biased forward of a forward surface thereof, wherein a rotation in said second rotational direction of said plurality of axially-extending ramps relative to said at least one axially-disposed spring-loaded pin causes an axially-aftward depression of said at least one axially-disposed spring-loaded pin within said corresponding at least one axial bore, and a rotation in said first rotational direction of said plurality of axially-extending ramps relative to said at least one axially-disposed spring-loaded pin causes at least one axially-extending step of said corresponding plurality of axially-extending steps to engage a portion of a side surface of at least one said axially-disposed spring-loaded pin so as to prevent a further relative rotational motion of said one of said sun gear or said ring gear relative to said other of said sun gear or said ring gear.

14. A pneumato-mechanical regenerative power source as recited in claim 1, wherein said first support structure comprises a housing enclosing said planetary gear system, said first roller-clutch mechanism, and said first actuator.

15. A pneumato-mechanical regenerative power source as recited in claim 1, further comprising a power coupling element operatively coupled to said one of said sun gear or said ring gear, wherein said power coupling element provides for coupling rotational power to or from said one of said sun gear or said ring gear from or to a source or sink of power external of said pneumato-mechanical regenerative power source.

16. A pneumato-mechanical regenerative power source as recited in claim 15, wherein said power coupling element comprises either a gear, a sprocket, a pulley, a coupler or a universal joint.

17. A pneumato-mechanical regenerative power source as recited in claim 1, further comprising:
  a. a second roller-clutch mechanism, wherein said second roller-clutch mechanism comprises:
    i. a second outer race comprising a second continuous surface of revolution about a second axis of rotation, wherein said second outer race provides for coupling rotational power to or from said one of said sun gear or said ring gear from or to a source or sink of power external of said pneumato-mechanical regenerative power source;
    ii. a second inner race comprising a plurality of second generalized facets, wherein said second inner race is generally concentric relative to said second outer race, and said second inner race is operatively coupled to said one of said sun gear or said ring gear;
    iii. a plurality of second rolling elements, wherein each second rolling element of said plurality of second rolling elements is located between said second outer race and one of said plurality of second generalized facets of said second inner race, a first gap between said second inner and outer races at a first range of locations along a second generalized facet of said plurality of second generalized facets is greater than a corresponding rolling diameter of said second rolling element, and a second gap between said second inner and outer races at at least one second range of locations along said second generalized facet is less than said corresponding rolling diameter of said second rolling element;
    iv. a second annular support structure, wherein said second annular support structure is rotatable about said second axis of rotation relative to said second inner and outer races; and
    v. a plurality of second fingers depending from said second annular support structure, wherein each second finger of said plurality of second fingers extends axially from said second annular support structure into a region between said second inner and outer races proximally adjacent to a corresponding one said plurality of second rolling elements, said second annular support structure in a first rotational position provides for locating said plurality of second fingers so as to provide for moving said plurality of second rolling elements into said first range of locations along corresponding said second generalized facets of said plurality of second generalized facets so as to engage said second inner and outer races to one another, and said second annular support structure in a second rotational position provides for locating said plurality of second fingers so as to provide for moving said plurality of second rolling elements into said at least one second range of locations along said corresponding said second generalized facets so as to disengage said second inner and outer races relative to one another; and
  b. a second actuator operatively associated with said second annular support structure so as to provide for positioning said second annular support structure in either said first rotational position or said second rotational position relative to said second inner race.

18. A pneumato-mechanical regenerative power source as recited in claim 17, wherein said second axis of rotation is coincident with said first axis of rotation.

19. A pneumato-mechanical regenerative power source as recited in claim 18, further comprising a power coupling element operatively coupled to said second outer race, wherein said power coupling element provides for coupling rotational power to or from said second outer race from or to a source or sink of power external of said pneumato-mechanical regenerative power source, wherein said second outer race is incorporated within said power coupling element.

20. A pneumato-mechanical regenerative power source as recited in claim 17, wherein each second rolling element comprises a ball bearing or a cylindrical roller, said second continuous surface of revolution of said second outer race comprises a second cylindrical surface, and each said second generalized facet on said second inner race comprises a planar surface.

21. A pneumato-mechanical regenerative power source as recited in claim 17, further comprising a plurality of second bias elements interposed between said plurality of second fingers and said plurality of second rolling elements, wherein said plurality of second bias elements provide for biasing said plurality of second rolling elements toward said at least one second range of locations so as to provide for engaging said second inner and outer races to one another responsive to a rotation of said second inner race in said first rotational direction.

22. A pneumato-mechanical regenerative power source as recited in claim 17, wherein said second actuator comprises:
  a. a second motor operatively coupled to said first support structure;
  b. a second worm drive operatively coupled to and driven by said second motor, wherein said second worm drive comprises:
    i. a second worm operatively coupled to a drive shaft of said second motor; and
    ii. a second worm gear driven by said second worm and supported for rotation by a third support structure operatively coupled to or a part of said first support structure;

c. a first gear operatively coupled to said second worm gear;
d. a second overrunning clutch operative between said second worm gear and said first gear; and
e. an external gear tooth profile operatively coupled to or a part of said second annular support structure, wherein said first gear mates and is engaged with said external gear tooth profile, said second overrunning clutch is configured to couple said first gear to said second worm gear so as to provide for said first gear to drive said external gear tooth profile, and said second overrunning clutch is configured to disengage said second worm gear from said first gear so as to prevent said external gear tooth profile rotating in said first rotational direction from driving said first gear.

23. A pneumato-mechanical regenerative power source as recited in claim 22, wherein said second motor and said third support structure are operatively coupled to said first support structure.

24. A pneumato-mechanical regenerative power source as recited in claim 22, wherein said second overrunning clutch is concentrically located within a bore of said second worm gear and a shaft portion extending from said first gear is concentrically located within said second overrunning clutch.

25. A pneumato-mechanical regenerative power source as recited in claim 1, wherein at least one said at least one anti-rotation pin comprises a fluid passage in fluid communication with said at least one region within said piston cylinder, further comprising a valve in series with said fluid passage, wherein said fluid passage and said valve provide for filling said at least one region with a gas, wherein a pressurization of said gas by a motion of said piston provides for storing potential energy in said gas.

26. A pneumato-mechanical regenerative power source as recited in claim 1, wherein said one of said ball screw or said ball nut constitutes a ball screw and said other of said ball screw or said ball nut constitutes a ball nut, said ball screw comprises or is operatively coupled to a forward shaft extension, said other of said sun gear or said ring gear is operatively coupled to said forward shaft extension so as to prevent a relative rotation therebetween, and said forward shaft extension is configured in cooperation with said other of said sun gear or said ring gear so as to limit aftward motion of said forward shaft extension relative to said other of said sun gear or said ring gear, further comprising:
a. a forward end cap, wherein said forward end cap is operatively coupled and sealed to or a part of a forward end of said piston cylinder and is operatively coupled to or a part of said first support structure, and said forward shaft extension extends through and is rotatably sealed to a central opening in said forward end cap; and
b. a thrust bearing operative between an aft surface of said other of said sun gear or said ring gear and a forward surface of said forward end cap, wherein said other of said sun gear or said ring gear, said thrust bearing and said forward end cap are located on said first axial side of said piston so that a pressure in said at least one region generates a thrust load from said other of said sun gear or said ring gear on said thrust bearing that is reacted by said forward end cap.

27. A pneumato-mechanical regenerative power source as recited in claim 26, further comprising at least one external groove on said ball nut, wherein said at least one anti-rotation pin cooperates with a corresponding said at least one external groove on said ball nut so as to prevent said rotation of said ball nut relative to said ball screw, and said at least one external groove is configured so as to provide for said ball nut to translate within said piston cylinder relative to said at least one anti-rotation pin.

28. A pneumato-mechanical regenerative power source as recited in claim 27, wherein said at least one anti-rotation pin comprises first and second anti-rotation pins that cooperate with corresponding first and second diametrically opposed external grooves on said ball nut so as to prevent said rotation of said ball nut relative to said ball screw, and said first and second diametrically opposed external grooves are configured so as to provide for said ball nut to translate within said piston cylinder relative to said first and second anti-rotation pins.

29. A pneumato-mechanical regenerative power source as recited in claim 27, further comprising at least one bearing located between said at least one anti-rotation pin and said at least one external groove.

30. A pneumato-mechanical regenerative power source as recited in claim 26, wherein said forward shaft extension incorporates a circumferential groove on an external surface thereof forward of a hub portion of said other of said sun gear or said ring gear in engagement with said forward shaft extension, further comprising a spring clip in engagement with said circumferential groove, wherein said spring clip provides for limiting said aftward motion of said forward shaft extension relative to said other of said sun gear or said ring gear.

31. A pneumato-mechanical regenerative power source as recited in claim 26, wherein said first overrunning clutch mechanism is operative between said one of said sun gear or said ring gear and said forward shaft extension and is radially disposed therebetween.

32. A pneumato-mechanical regenerative power source as recited in claim 26, wherein said one of said sun gear or said ring gear comprises or is operatively coupled to a forward hollow shaft extension concentric with and configured to rotate relative to said forward shaft extension of said ball screw, further comprising:
a. a power coupling element operatively coupled to said second outer race, wherein said power coupling element is supported by said forward shaft extension of said ball screw for rotation thereabout;
b. a second roller-clutch mechanism, wherein said second roller-clutch mechanism comprises:
i. a second outer race comprising a second continuous surface of revolution about said first axis of rotation, wherein said second outer race provides for coupling rotational power to or from said one of said sun gear or said ring gear from or to a source or sink of power external of said pneumato-mechanical regenerative power source, and said power coupling element provides for coupling said rotational power to or from said second outer race from or to said source or sink of power external of said pneumato-mechanical regenerative power source;
ii. a second inner race comprising a plurality of second generalized facets, wherein said second inner race is generally concentric relative to said second outer race, and said second inner race is operatively coupled to said one of said sun gear or said ring gear;
iii. a plurality of second rolling elements, wherein each second rolling element of said plurality of second rolling elements is located between said second outer race and one of said plurality of second generalized facets of said second inner race, a first gap between said second inner and outer races at a first range of locations along a second generalized facet of said plurality of second generalized facets is greater than a corresponding rolling diameter of said second rolling element, and a second gap between said second inner and outer races at at least one second range of locations along said second generalized facet is less than said corresponding rolling diameter of said second rolling element;

iv. a second annular support structure, wherein said second annular support structure is rotatable about said first axis of rotation relative to said second inner and outer races; and v. a plurality of second fingers depending from said second annular support structure, wherein each second finger of said plurality of second fingers extends axially from said second annular support structure into a region between said second inner and outer races proximally adjacent to a corresponding one said plurality of second rolling elements, said second annular support structure in a first rotational position provides for locating said plurality of second fingers so as to provide for moving said plurality of second rolling elements into said first range of locations along corresponding said second generalized facets of said plurality of second generalized facets so as to engage said second inner and outer races to one another, and said second annular support structure in a second rotational position provides for locating said plurality of second fingers so as to provide for moving said plurality of second rolling elements into said at least one second range of locations along corresponding said second generalized facets so as to disengage said second inner and outer races relative to one another; and c. a second actuator operatively associated with said second annular support structure so as to provide for positioning said second annular support structure in either said first rotational position or said second rotational position relative to said second inner race.

33. A pneumato-mechanical regenerative power source as recited in claim 26, wherein said other of said sun gear or said ring gear is either keyed or splined to said forward shaft extension of said ball screw.

34. A pneumato-mechanical regenerative power source as recited in claim 1, further comprising an internal spring clip in cooperation with an inner groove within said piston cylinder proximate to an aft end thereof, wherein said internal spring clip provides for preventing said piston from traveling past said internal spring clip and exiting said aft end of said piston cylinder.

35. A method of substantially converting between rotational power and stored potential energy, or substantially retaining said stored potential energy, comprising:

a. in a first mode of operation that provides for converting rotational power to stored potential energy:
  i. causing a rotation in a first rotational direction of one of a sun gear or a ring gear of a planetary gear system with the rotational power from an external source;
  ii. releasably locking a carrier of said planetary gear system to a fixed frame of reference relative to said rotation of said one of said sun gear or said ring gear so as to cause the other of said sun gear or said ring gear of said planetary gear system to rotate in a second rotational direction that is opposite to said first rotational direction;
  iii. rotating a first portion of a ball-screw mechanism in said first rotational direction with said other of said sun gear or said ring gear operatively coupled thereto;
  iv. causing a translation of a piston in a bore of a piston cylinder with a second portion of said ball-screw mechanism responsive to a rotation of said other of said sun gear or said ring gear in said first rotational direction so as to reduce a volume in a first portion of said bore bounded by said piston, wherein said ball-screw mechanism provides for a translation of said second portion of said ball-screw mechanism responsive to a rotation of said first portion of said ball-screw mechanism; and
  v. compressing a gas within said first portion of said bore responsive to said translation of said piston within said bore, so as to increase a pressure of said gas and store the potential energy as a result of the pressurization of said gas;

b. in a second mode of operation that provides for retaining said stored potential energy:
  i. releasably locking said carrier of said planetary gear system to said fixed frame of reference;
  ii. converting said pressure of said gas in said first portion of said bore acting on said piston to a torque in said first portion of said ball-screw mechanism by action of said piston on said second portion of said ball-screw mechanism and by action of said ball-screw mechanism responsive thereto, wherein said torque acts in said first rotational direction; and
  iii. coupling said torque in said first portion of said ball-screw mechanism acting in said first rotational direction to said one of said sun gear or said ring gear through an overrunning clutch, wherein said overrunning clutch operates in an overrunning condition during said first mode of operation;

c. in a third mode of operation that provides for converting said stored potential energy to rotational power at said one of said sun gear or said ring gear:
  i. releasing said carrier of said planetary gear system to rotate relative to said fixed frame of reference;
  ii. converting said pressure of said gas in said first portion of said bore acting on said piston to a torque in said first portion of said ball-screw mechanism by action of said piston on said second portion of said ball-screw mechanism and by action of said ball-screw mechanism responsive thereto, wherein said torque acts in said first rotational direction; and
  iii. coupling said torque in said first portion of said ball-screw mechanism acting in said first rotational direction to said one of said sun gear or said ring gear through said overrunning clutch and rotating said one of said sun gear or said ring gear responsive thereto, thereby delivering rotational power to said one of said sun gear or said ring gear and causing a rotation thereof in said first rotational direction.

36. A method of substantially converting between rotational power and stored potential energy, or substantially retaining said stored potential energy as recited in claim 35, further comprising releasably coupling said one of said sun gear or said ring gear to either said external source or to another external load so as to provide for either transferring said rotational power to said one of said sun gear or said ring gear from said external source, or transferring said rotational power from said one of said sun gear or said ring gear to either said external source acting as a load, or to said another external load.

37. A method of substantially converting between rotational power and stored potential energy, or substantially retaining said stored potential energy as recited in claim 36, wherein said external source comprises a transmission of a vehicle.

38. A method of substantially converting between rotational power and stored potential energy, or substantially retaining said stored potential energy as recited in claim 37, wherein the operation of transferring said rotational power to said one of said sun gear or said ring gear from said external source provides for dynamically braking said vehicle.

39. A method of substantially converting between rotational power and stored potential energy, or substantially retaining said stored potential energy as recited in claim 36, wherein said external source comprises a motor driven by an external electrical power source.

40. A method of substantially converting between rotational power and stored potential energy, or substantially retaining said stored potential energy as recited in claim 36, wherein said another external load comprises an electrical generator.

41. A method of substantially converting between rotational power and stored potential energy, or substantially retaining said stored potential energy as recited in claim 35, wherein said first portion of said ball-screw mechanism comprises a ball screw, and said second portion of said ball-screw mechanism comprises a ball nut.

42. A method of substantially converting between rotational power and stored potential energy, or substantially retaining said stored potential energy as recited in claim 35, wherein the operation of releasably locking said carrier of said planetary gear system comprises: wedging a plurality of first rolling elements between a first outer race and a corresponding plurality of first generalized facets of a first inner race and of a first roller-clutch mechanism, each first generalized facet of said plurality of first generalized facets in cooperation with said first outer race is sized so that said first outer race is free to rotate relative to said first inner race when said plurality of first rolling elements are within a first range of locations along said first generalized facets, and said first outer race is releasably locked relative to said first inner race when said plurality of first rolling elements outside said first range of locations along said first generalized facets; and the operation of releasing said carrier of said planetary gear system comprises:
  a. rotating said first inner race of a first roller-clutch mechanism away from a nominal rotational position in a direction of loading thereof by said plurality of first rolling elements wedged and reacting against said first outer race of said first roller-clutch mechanism so as to release said plurality of first rolling elements from being wedged therebetween;
  b. repositioning said plurality of first rolling elements so as to be located within said first range of locations along said first generalized facets when said first inner race is returned to said nominal rotational position; and
  c. rotationally repositioning said first inner race of said first roller-clutch mechanism to said nominal rotational position.

43. A roller-clutch system, comprising:
  a. a roller clutch mechanism, comprising:
    i. an outer race comprising a continuous surface of revolution about an axis of rotation;
    ii. an inner race comprising a plurality of first generalized facets, wherein said inner race is operatively coupled to a first support structure, and said inner race is rotatable relative to said first support structure;
    iii. a plurality of rolling elements, wherein each rolling element of said plurality of rolling elements is located between said outer race and one of said generalized facets of said inner race, a first gap between said inner and outer races at a first range of locations along a generalized facet of said plurality of generalized facets is greater than a corresponding rolling diameter of said rolling element, and a second gap between said inner and outer races at at least one second range of locations along said generalized facet is less than said corresponding rolling diameter of said rolling element;
    iv. an annular support structure, wherein said annular support structure is rotatable about said axis of rotation relative to said inner and outer races; and
    v. a plurality of fingers depending from said annular support structure, wherein each finger of said plurality of fingers extends axially from said annular support structure into a region between said inner and outer races proximally adjacent to a corresponding one said rolling element, said annular support structure in a rotational position provides for locating said plurality of fingers so as to provide for biasing said plurality of rolling elements into said first range of locations along corresponding said generalized facets of said plurality of generalized facets so as to disengage said inner and outer races relative to one another, and said annular support structure in a second rotational position provides for locating said plurality of fingers so as to provide for biasing said plurality of rolling elements into said second range of locations along said corresponding said generalized facets so as to engage said inner and outer races to one another; and
  b. an actuator operatively associated with said annular support structure so as to provide for positioning said annular support structure in either said rotational position or said second rotational position relative to said support structure, wherein either said actuator or another actuator provides for rotating said first inner race in said first rotational direction relative to said first support structure so as to provide for disengaging said roller-clutch mechanism.

44. A roller-clutch system as recited in claim 43, wherein each rolling element comprises a ball bearing or a cylindrical roller, said continuous surface of revolution of said outer race comprises a cylindrical surface, and each said generalized facet on said inner race comprises a planar surface.

45. A roller-clutch system as recited in claim 43, further comprising a plurality of bias elements interposed between said plurality of fingers and said plurality of rolling elements, wherein said plurality of bias elements provide for biasing said plurality of rolling elements toward said second range of locations so as to provide for engaging said inner and outer races to one another responsive to a rotation of said carrier in said rotational direction.

46. A roller-clutch system as recited in claim 43, wherein said actuator comprises:
  a. a motor operatively coupled to said first support structure;
  b. a worm drive operatively coupled to and driven by said motor, wherein said worm drive comprises:
    i. a worm operatively coupled to a drive shaft of said motor; and
    ii. a worm gear driven by said worm;
  c. a first cam surface operatively coupled to or a part of said worm gear, wherein said first cam surface and said worm gear are supported for rotation by a second support structure operatively coupled to or a part of said first support structure; and d. a first cam follower operative between said first cam surface and said annular support structure so as to provide for rotating said annular support structure about said axis of rotation.

47. A roller-clutch system as recited in claim 46, wherein said first cam surface comprises an internal surface within a hollow portion of a cam, and said first cam follower comprises a bearing rotatable about a shaft portion depending from said annular support structure.

48. A roller-clutch system as recited in claim 46, wherein an action of said first cam follower following said first cam surface responsive to a rotation of said cam by said worm gear provides for rotating said annular support structure into said first rotational position, thereby disengaging said roller-clutch mechanism and providing for said outer race to rotate relative to said first support structure.

49. A roller-clutch system as recited in claim 43, further comprising:
   a. a second cam surface, wherein said second cam surface is movable relative to said first support structure responsive to an actuation by either said actuator or by said another actuator; and
   b. a second cam follower, wherein said second cam follower is operatively coupled to said inner race so as to provide for rotating said inner race relative to said first support structure responsive to an action of said second cam surface on said second cam follower.

50. A roller-clutch system as recited in claim 49, wherein said second cam surface comprises an external rotary cam surface, and said second cam follower is operatively coupled to said inner race with an associated linkage.

51. A roller-clutch system as recited in claim 47, further comprising:
   a. a second cam surface, wherein said second cam surface comprises an external rotary cam surface on said cam that is rotatable relative to said first support structure responsive to an actuation by said actuator; and
   b. a second cam follower, wherein said second cam follower is operatively coupled to said inner race so as to provide for rotating said inner race relative to said first support structure responsive to an action of said second cam surface on said second cam follower, and said second cam follower is operatively coupled to said inner race with an associated linkage.

52. A roller-clutch system as recited in claim 51, wherein said worm gear is rotatable about a shaft portion operatively coupled to or a part of said cam, said worm gear comprises an internal circumferential slot that cooperates with a radially-extending protrusion extending from said shaft portion of said cam, and said internal circumferential slot comprises first and second radial edges that respectively engage opposing portions of said radially-extending protrusion at different first and second relative rotational positions of said worm gear relative to said cam over a range of lost motion, further comprising a torsion spring operative between said cam and said worm gear so as to provide for biasing said cam relative to said worm gear at said first relative rotational position.

53. A roller-clutch system as recited in claim 52, wherein said cam is configured to provide for sensing a rotation thereof by either a corresponding switch or rotational position sensor so as to provide for controlling a rotation of said motor.

* * * * *